United States Patent
Motohashi

(10) Patent No.: US 9,307,511 B2
(45) Date of Patent: Apr. 5, 2016

(54) APPARATUS AND METHOD FOR CONTROLLING CALL RECEPTION

(71) Applicant: FUJITSU LIMITED, Kawasaki-shi, Kanagawa (JP)

(72) Inventor: Kayo Motohashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 57 days.

(21) Appl. No.: 14/048,564

(22) Filed: Oct. 8, 2013

(65) Prior Publication Data

US 2014/0128065 A1    May 8, 2014

(30) Foreign Application Priority Data

Nov. 2, 2012    (JP) ................. 2012-243168

(51) Int. Cl.
*H04W 4/00*     (2009.01)
*H04W 60/00*    (2009.01)
*H04W 60/06*    (2009.01)

(52) U.S. Cl.
CPC .............. *H04W 60/00* (2013.01); *H04W 60/06* (2013.01)

(58) Field of Classification Search
CPC ............................... H04W 60/00; H04W 36/00
See application file for complete search history.

(56) References Cited

U.S. PATENT DOCUMENTS

| 2003/0216134 | A1* | 11/2003 | Mutoh | H04M 1/72538 455/404.1 |
|---|---|---|---|---|
| 2009/0298472 | A1 | 12/2009 | Nagano | |
| 2011/0292856 | A1* | 12/2011 | Park et al. | 370/311 |
| 2014/0024378 | A1* | 1/2014 | Khude et al. | 455/437 |

FOREIGN PATENT DOCUMENTS

| JP | 2009-290578 | 12/2009 |
|---|---|---|
| JP | 2010-068184 | 3/2010 |
| JP | 2010-157918 | 7/2010 |
| JP | 2010-199715 | 9/2010 |
| JP | 2011-188040 | 9/2011 |

* cited by examiner

*Primary Examiner* — Justin Lee
(74) *Attorney, Agent, or Firm* — Myers Wolin, LLC

(57) ABSTRACT

A base station registers a mobile station subjected to the call reception control of the base station. When connection between the mobile station registered by the base station and a higher-level device of the base station is terminated after detecting that the mobile station is located in a communication area of the base station, the base station causes the higher-level device to maintain information indicating that the mobile station is located in the communication area, without notifying the higher-level device of termination of the connection. When a call addressed to the mobile station is detected after termination of the connection between the mobile station and the higher-level device, the base station gives a notification about detection of the call.

5 Claims, 21 Drawing Sheets

FIG. 2A

UE MANAGEMENT TABLE (171)

| BASE-STATION ID (171a) | UE-ID (171b) | | | |
|---|---|---|---|---|
| 20-1 | 30-1 | 30-2 | 30-3 | ... |
| 20-2 | 30-4 | 30-5 | ... | ... |
| 20-3 | 30-6 | 30-7 | 30-8 | ... |
| ⋮ | | | | |

FIG. 2B

UE MANAGEMENT TABLE (261)

| UE-ID (261a) | UE STATE (261b) | PAGING INFORMATION (261c) |
|---|---|---|
| 30-1 | REGISTERED | INCOMING-CALL-LIST INFORMATION |
| 30-2 | Detach | – |
| 30-3 | Active | INCOMING-CALL-LIST INFORMATION |
| ⋮ | | | ized on Nov. 2, 2012, the entire contents of which are
APPARATUS AND METHOD FOR CONTROLLING CALL RECEPTION

CROSS-REFERENCE TO RELATED APPLICATION

This application is based upon and claims the benefit of priority of the prior Japanese Patent Application No. 2012-243168, filed on Nov. 2, 2012, the entire contents of which are incorporated herein by reference.

FIELD

The embodiments discussed herein are related to a base station and a system and method for controlling call reception.

BACKGROUND

When mobile stations including mobile phones in the related art receive a call addressed thereto from another mobile station, the mobile stations transmit and receive various messages needed for establishing lines and handling incoming and outgoing calls, to and from a base station and a higher-level device thereof. In particular, in long-term evolution (LTE), which is a wireless communication system that is becoming increasingly common in recent years, when power is turned on, a mobile station establishes lines with a base station and a mobility management entity (MME) or a serving-gateway (S-GW) on a core network by an attaching process so as to be located in a communication area. This process allows the mobile station to receive calls addressed to the mobile station from another mobile station via the base station and the core network. Thereafter, for example, when the power of the mobile station is turned off, the mobile station requests the MME to delete the location information thereof (detaching process) via the base station. Upon receiving the request, the MME deletes the location information of the mobile station to complete the detaching process.

Japanese Laid-open Patent Publication No. 2009-290578, No. 2010-199715, No. 2010-68184, No. 2011-188040, No. 2010-157918 are examples of related art.

SUMMARY

According to an aspect of the invention, a base station registers a mobile station subjected to the call reception control of the base station. When a connection between the registered mobile station and a higher-level device of the base station is terminated after detecting that the mobile station is located in a communication area of the base station, the base station causes the higher-level device to maintain information indicating that the mobile station is located in the communication area, without notifying the higher-level device of termination of the connection. When a call addressed to the mobile station is detected after termination of the connection between the mobile station and the higher-level device, the base station gives a notification about detection of the call.

Certain objects and advantages of the invention will be realized and attained by means of the elements and combinations particularly pointed out in the claims.

It is to be understood that both the foregoing general description and the following detailed description are exemplary and explanatory and are not restrictive of certain embodiments of the invention, as claimed.

BRIEF DESCRIPTION OF DRAWINGS

FIG. 2A is a diagram illustrating an example of data stored in a user-equipment (UE) management table, according to an embodiment;

FIG. 2B is a diagram illustrating an example of data stored in a UE management table, according to an embodiment;

DESCRIPTION OF EMBODIMENTS

The procedure described above is based on the precondition that the mobile station is within the communication area of the base station during a receiving process, so that the mobile station can receive a paging signal transmitted from the base station. For example, when a call is made from another mobile station, the incoming call is not detected in real time by the user of the mobile station unless the mobile station receives the paging signal. Accordingly, for example, in the case where the power of the mobile station is off or the battery is exhausted, or in the case where the mobile station is out of the communication area even though the power is on, or in the case where the user does not perceive an incoming call because the mobile station is in a bag, the incoming call is not detected by the user. Such a problem may occur not only when the power of the mobile station itself is off, but also may occur when the function of communicating with a mobile phone network is off even though the power of the mobile station itself is on. For example, in cases where the user uses the mobile station connected only to a wireless local area network (LAN) or as a game machine that does not communicate with another unit.

Embodiments of a base station and a system and method for controlling call reception disclosed in this application will be described in detail below with reference to the drawings. The base station and the system and method for controlling call reception disclosed in this application are not limited to the embodiments.

Figure 1:
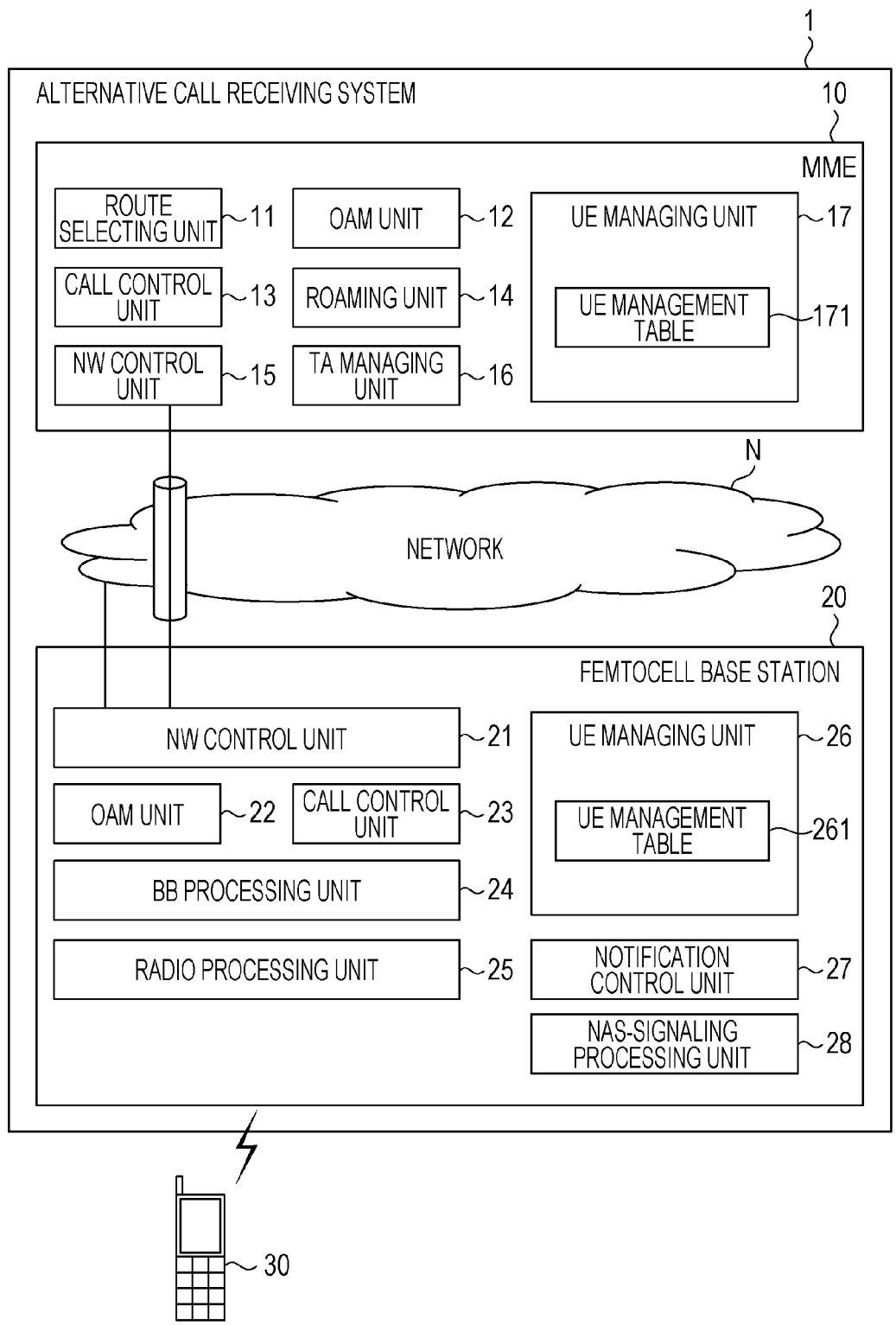
FIG. 1 is a diagram illustrating an example of a functional configuration of an alternative call receiving system, according to an embodiment.

The configuration of an alternative call receiving system according to an embodiment of this application will be described hereinafter. FIG. 1 is a diagram illustrating an example of a functional configuration of an alternative call receiving system, according to an embodiment. As illustrated in FIG. 1, the alternative call receiving system 1 includes an MME 10 serving as a higher-level node and a femtocell base station 20. The MME 10 and the femtocell base station 20 are connected together via a network N. The MME 10 includes a route selecting unit 11, an operation administration and maintenance (OAM) unit 12, a call control unit 13, a roaming unit 14, a network (NW) control unit 15, a tracking-area (TA) managing unit 16, and a user-equipment (UE) managing unit 17. These components are connected so as to allow signals and data to be input and output unidirectionally or bidirectionally.

The route selecting unit 11 selects an MME that is to be newly connected and a route to which data is to be transmitted when a handover that involves changing the MME 10 has occurred. The OAM unit 12 monitors the operating states of the MME 10 and the network N that the MME 10 connects to, and when detecting an abnormality in a communication function or performance or a fault thereof, the OAM unit 12 notifies a higher-level device (for example, a home subscriber server (HSS) or a client device (for example, a femtocell base station 20) of it. The call control unit 13 performs non-access stratum (NAS) control of user calls, such as delivery of a paging message, security control, control of movement of the UE including UE (mobile station) 30, and bearer control. The roaming unit 14 performs roaming control for providing services provided by a telecommunications carrier also out of the area of the telecommunications carrier using the facilities etc. of another carrier. The NW control unit 15 controls the wired connection between the MME 10 and the network N. The TA managing unit 16 manages a list on which the TA of the MME 10 is recorded.

The UE managing unit 17 identifies, registers, and deregisters each UE connected thereunder, and sends information on the movement of the UE to the femtocell base station 20. The UE managing unit 17 includes a UE management table 171. FIG. 2A is a diagram illustrating an example of data stored in a UE management table, according to an embodiment. As illustrated in FIG. 2A, the UE management table 171 of the MME 10 has a base-station-ID storage area 171a and a UE-ID storage area 171b. The base-station-ID storage area 171a updatably stores "base station IDs" (for example, "20-1", "20-2", . . . ) as information for identifying base stations including the femtocell base station 20. The UE-ID storage area 171b updatably stores "UE IDs" (for example, "30-1", "30-2", . . . ) as information for identifying a UE located in the communication area of a corresponding base station. Examples of the UE IDs include the International mobile subscriber identifier (IMSI), the temporary mobile subscriber identifier (TMSI), and the globally unique temporary identifier (GUTI).

The femtocell base station 20 includes a NW control unit 21, an OAM unit 22, a call control unit 23, a NAS-signaling processing unit 28, a baseband (BB) processing unit 24, a radio processing unit 25, a UE managing unit 26, and a notification control unit 27. These components are connected so as to be able to input and output signals and data unidirectionally or bidirectionally. The NW control unit 21 controls the wired connection between the femtocell base station 20 and the network N. The OAM unit 22 monitors the states of the femtocell base station 20 and the network N to which the femtocell base station 20 is connected, and when an abnormality in a communication function or performance or a fault thereof is detected, the OAM unit 22 notifies a higher-level device (for example, the MME 10) or a client device (for example, the UE 30) of it. The call control unit 23 performs wireless-resource control, selection of MMEs to which the individual pieces of a UE are to be connected, handover control, scheduling and transferring paging messages, transferring user data, compression and encryption of data, and so on. The BB processing unit 24 processes baseband signals in a physical layer, a media access control (MAC) layer, a radio link control (RLC) layer, and other layers. The NAS-signaling processing unit 28 confirms NAS signaling performed between a UE and MMEs and acquires identifiers of a UE. The radio processing unit 25 transmits and receives radio signals to and from the UE using physical channels in accordance with the communication control agreement of the 3rd generation partnership project (3GPP).

The UE managing unit 26 identifies, registers, and deregisters each UE connected thereunder, and monitors the states of the UE. In particular, upon receiving a paging signal addressed to the UE 30 registered with the femtocell base station 20, the UE managing unit 26 instructs the notification control unit 27, to be described later, to notify the user of the UE 30 of the reception. The UE managing unit 26 includes a UE management table 261. FIG. 2B is a diagram illustrating an example of data stored in a UE management table, according to an embodiment. As illustrated in FIG. 2B, the UE management table 261 of the femtocell base station 20 includes UE-ID storage area 261a, a UE-state storage area 261b, and a paging-information storage area 261c. The UE-ID storage area 261a updatably stores "UE IDs" (for example, "30-1", "30-2", . . . ) as information for identifying a UE including the UE 30. The UE-state storage area 261b updatably stores "UE states" as information indicating the states of a corresponding UE. Examples of the UE states include "Unregistered", "Registered", "Detach", "Active", and "Idle", with respect to the femtocell base station 20. The paging-information storage area 261c updatably stores "paging information" of which the corresponding UE is not notified.

The notification control unit 27 controls notification units, such as a light-emitting diode (LED), a speaker, and a display, as a whole and notifies the user of an incoming call instead of the UE 30, in accordance with the instruction from the UE managing unit 26.

Figure 3:
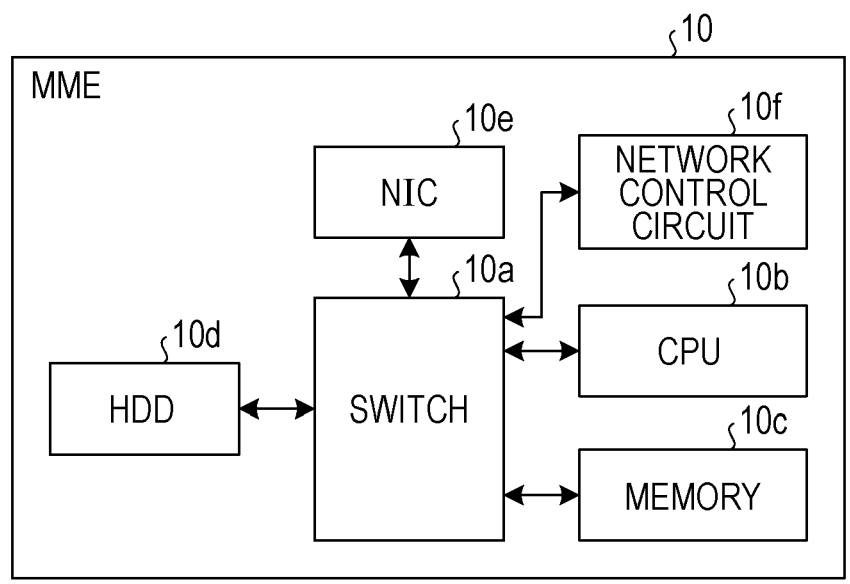
FIG. 3 is a diagram illustrating an example of a hardware configuration of a mobility management entity (MME), according to an embodiment.

Next, the hardware configurations of the MME 10 and the femtocell base station 20 will be described. FIG. 3 is a diagram illustrating an example of a hardware configuration of an MME, according to an embodiment. As illustrated in FIG. 3, the MME 10 is configured such that a central processing unit (CPU) 10b, a memory 10c, such as a synchronous dynamic random access memory (SDRAM), a hard disk drive (HDD) 10d, a network interface card (NIC) 10e, and a network control circuit 10f are connected via a switch 10a so as to allow various signals and data to be input and output. The route selecting unit 11, the OAM unit 12, the call control unit 13, and the roaming unit 14 are implemented by, for example, using the CPU 10b and the memory 10c. The NW control unit 15 is implemented by, for example, using the NIC 10e, the memory 10c, and the network control circuit 10f. The TA managing unit 16 and the UE managing unit 17 are implemented by, for example, using the CPU 10b, the memory 10c, and the HDD 10d.

Figure 4:
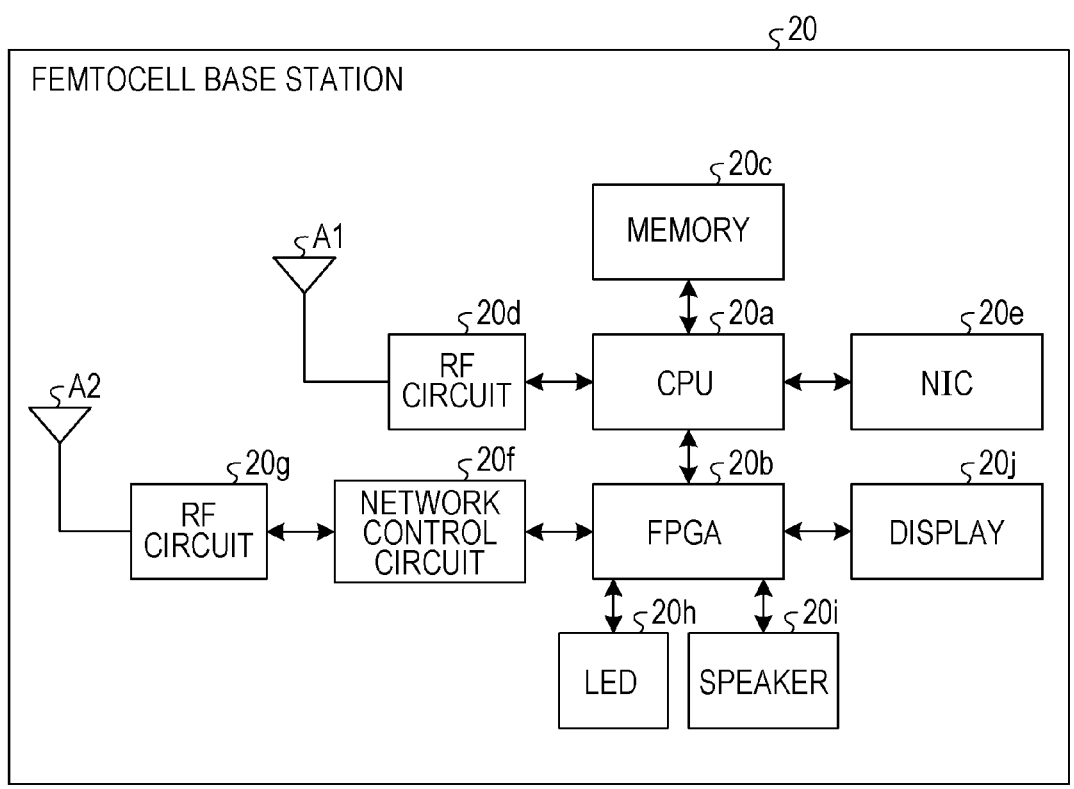
FIG. 4 is a diagram illustrating an example of a hardware configuration of a femtocell base station, according to an embodiment.

FIG. 4 is a diagram illustrating an example of a hardware configuration of a femtocell base station, according to an embodiment. As illustrated in FIG. 4, the femtocell base station 20 includes, as hardware components, a CPU 20a, a field programmable gate array (FPGA) 20b, a memory 20c, radio frequency (RF) circuits 20d and 20g, and an NIC 20e. The femtocell base station 20 further includes a network control circuit 20f, an LED 20h, a speaker 20i, and a display 20j. The RF circuits 20d and 20g include antennas A1 and A2, respectively. Examples of the memory 20c include a RAM, such as an SDRAM, a read only memory (ROM), and a flash memory.

The NW control unit 21 is implemented by, for example, using the NIC 20e, the CPU 20a, and the memory 20c. The OAM unit 22, the call control unit 23, the BB processing unit 24, the notification control unit 27, and the NAS-signaling processing unit 28 are implemented by, for example, using integrated circuits, such as the CPU 20a and the FPGA 20b, and the memory 20c. The radio processing unit 25 is implemented by, for example, using the RF circuits 20d and 20g and the network control circuit 20f. The UE managing unit 26 is implemented by, for example, using the CPU 20a, the FPGA 20b, and the memory 20c. Notification of an incoming call to the user of the UE 30 is implemented by, for example, using any of the LED 20h, the speaker 20i, and the display 20j. The LED 20h notifies the user of an incoming call by lighting or flashing. The speaker 20i notifies the user of an incoming call by ringing. The display 20j notifies the user of an incoming call by displaying it on a liquid crystal display (LCD), an electro luminescence (EL) display, or the like.

Next, the operation of the alternative call receiving system 1 of this embodiment will be described. In the following description, the alternative call receiving system 1 is classified into three phases: an advanced registration phase in which a UE targeted for alternative call reception is registered, an alternative call reception phase in which alternative call reception is executed, and a registration cancellation phase in which the registration of the target UE is cancelled.

Figure 5:
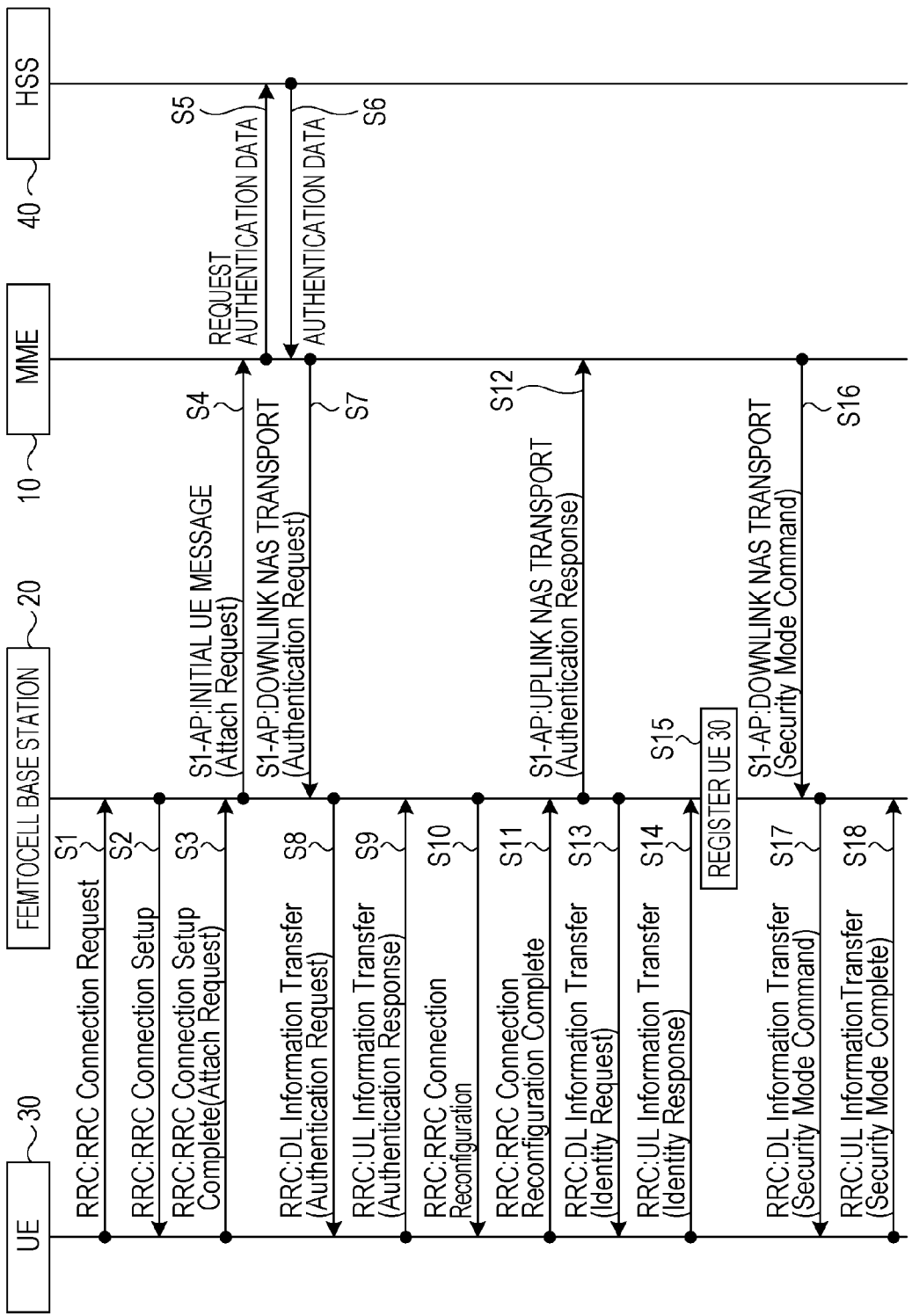
FIG. 5 is a sequence diagram which describes the first half of an alternative call reception registration process in the case where a UE is registered when attaching to a femtocell base station, according to an embodiment.
Figure 6:
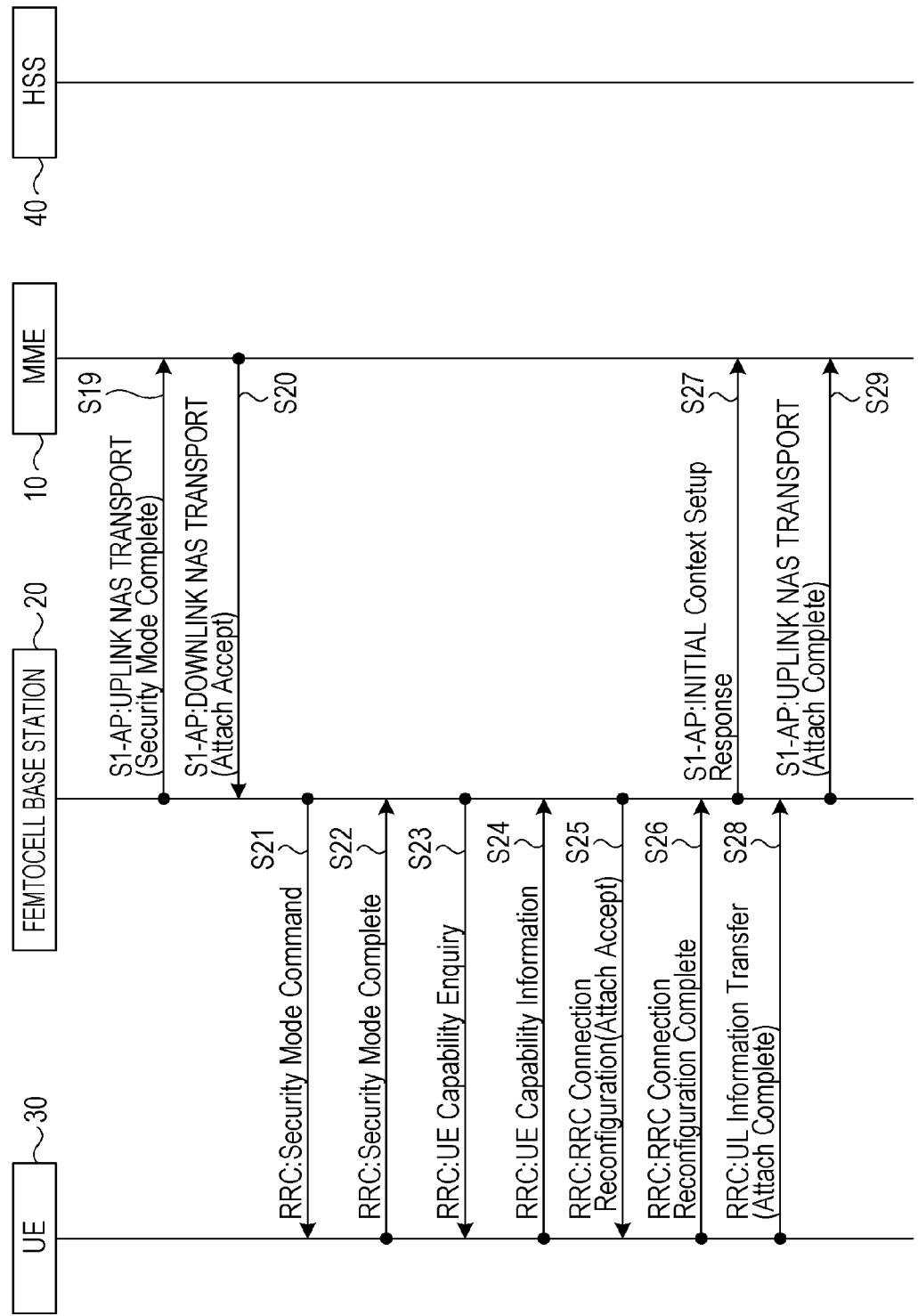
FIG. 6 is a sequence diagram which describes the latter half of the alternative call reception registration process in the case where a UE is registered when attaching to a femtocell base station, according to an embodiment.

First, the operation in the advanced registration phase will be described. FIGS. 5 and 6 are diagrams illustrating an alternative call reception registration process in the case where the UE 30 is registered when attaching to the femtocell base station 20. When the power of the UE 30 is turned on, the UE 30 establishes a radio resource control (RRC) connection to the femtocell base station 20 that forms a cell in which the UE 30 is located (S1 and S2).

The UE 30 starts an attaching process to the MME 10 after the RRC connection is established (S3).

Upon receiving the attachment request from the UE 30, the MME 10 executes an authentication procedure to authenticate the UE 30 (S4 to S11).

The femtocell base station 20 monitors NAS signaling by using the NAS-signaling processing unit 28, and upon receiving completion of the authentication procedure (Authentication Response (S9) from the UE 30, the femtocell base station 20 transmits the Authentication Response to the MME 10 by using UPLINK NAS TRANSPORT (S12) and transmits an Identity Request to the UE 30 by using DownLink Information Transfer (S13), thereby requesting the UE 30 targeted for alternative call reception registration to transmit the ID thereof. Upon receiving the Identity request, the UE 30 transmits an Identity Response to the femtocell base station 20 by UpLink Information Transfer (S14), thereby notifying the ID of the UE 30. Upon receiving the ID, the UE managing unit 26 of the femtocell base station 20 associates the UE 30 with the "UE ID" in the UE management table 261 (see FIG. 2B) and sets "UE state" at "Registered" (S15). In the case where some value is set to "UE state", the UE managing unit 26 updates the value to "Registered".

Upon completion of the authentication of the UE 30, the MME 10 executes a security-mode control procedure to encrypt a message signal and ensure the security (S16 to S22). The femtocell base station 20 collects information on the capability of wireless access of the UE 30 (S23, S24). After completion of all the processes, the attaching process is completed (S25 to S29).

Figure 7:
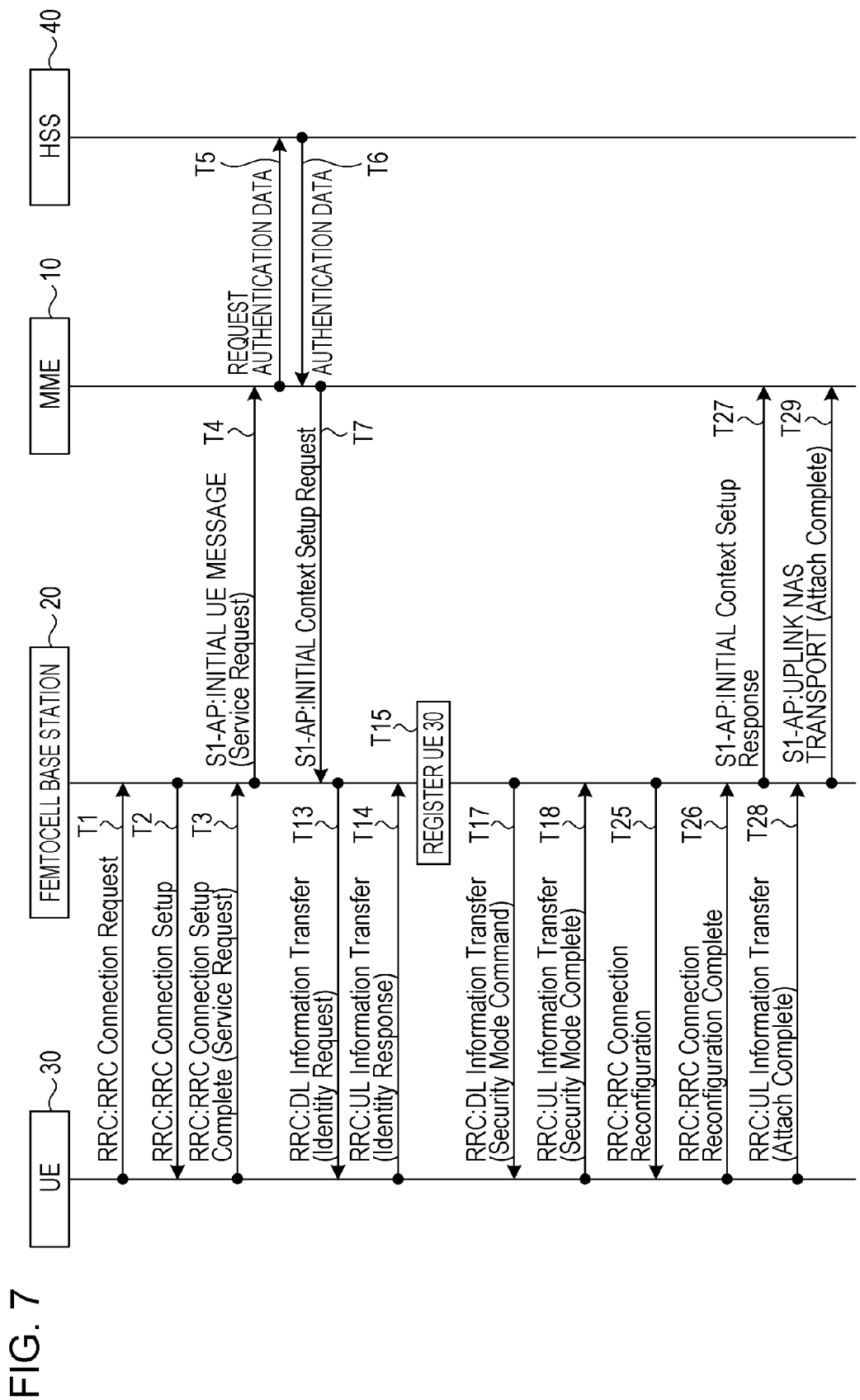
FIG. 7 is a diagram illustrating an example of an operational sequence for an alternative call reception registration process in the case where a UE is registered when a call from the UE is made, according to an embodiment.

An example in which the alternative call receiving system 1 registers the UE 30 when attaching to the femtocell base station 20 is illustrated above; the timing of alternative call reception registration is not limited to the time of attaching and may be the time when a transmission from the UE 30 is made. FIG. 7 is a sequence diagram for explaining an alternative call reception registration process in the case where the UE 30 is registered when a call from the UE 30 is made. Since FIG. 7 includes the same processes as those in FIGS. 5 and 6, common steps are given reference signs whose last numbers are the same, and detailed descriptions thereof will be omitted. Specifically, the processes in steps T1 to T7, T13 to T15, T17, and T18 of FIG. 7 correspond to the processes in steps S1 to S7, S13 to S15, S17, and S18 of FIG. 5, respectively. The processes in steps T25 to T29 of FIG. 7 correspond to the processes in steps S25 to S29 of FIG. 6, respectively. As illustrated in FIG. 7, the alternative call reception registration process for the UE 30 may not necessarily be executed when attaching to the femtocell base station 20 and may be executed when the UE 30 that has completed the attaching process transmits a call or mail (a communication) to another UE.

Figure 8:
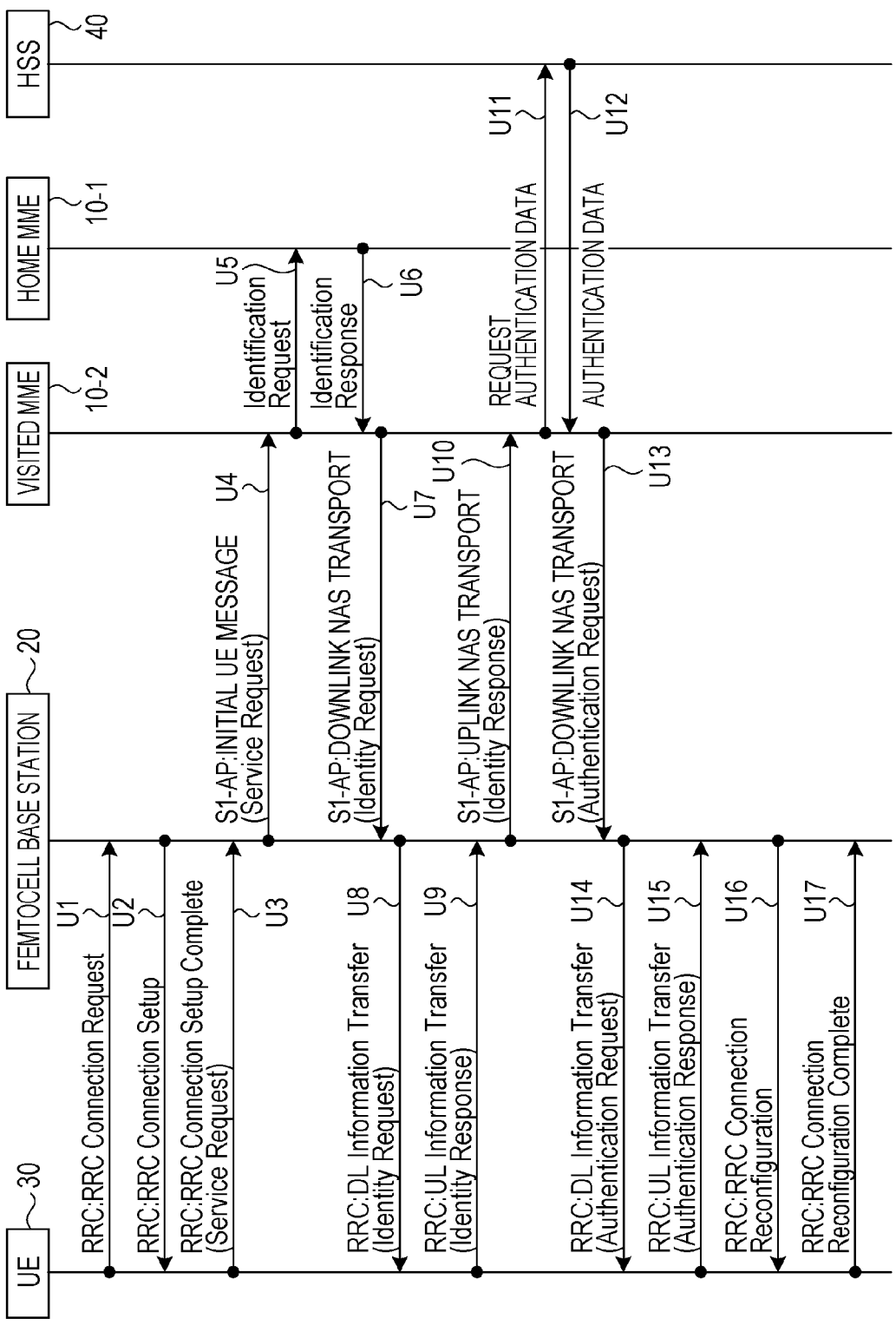
FIG. 8 is a diagram illustrating an example of an operational sequence for an alternative call reception registration process in the case where a UE is registered when a position of the UE is registered, according to an embodiment.

Furthermore, the timing at which the alternative call receiving system 1 executes the alternative call reception registration is not limited to the time of attachment or a call being made and may be the time when the location of the UE 30 is registered. FIG. 8 is a sequence diagram for explaining the first half of an alternative call reception registration process in the case where the UE 30 is registered when the location of the UE 30 is registered. In FIG. 8, both the configuration of an MME (home MME) to which the UE 30 has been connected before movement and the configuration of an MME (visited MME) to which the UE 30 is connected after the movement are the same as that of the MME 10 described above. Accordingly, in the following description, the MME to which the UE 30 has been connected before the movement is referred to as "home MME 10-1", and the MME to which the UE 30 is connected after the movement is referred to as "visited MME 10-2", so as to distinguish the MMEs 10. Common components between the MMEs 10-1 and 10-2 are given reference signs whose last numbers are the same, and detailed descriptions thereof will be omitted.

Figure 9:
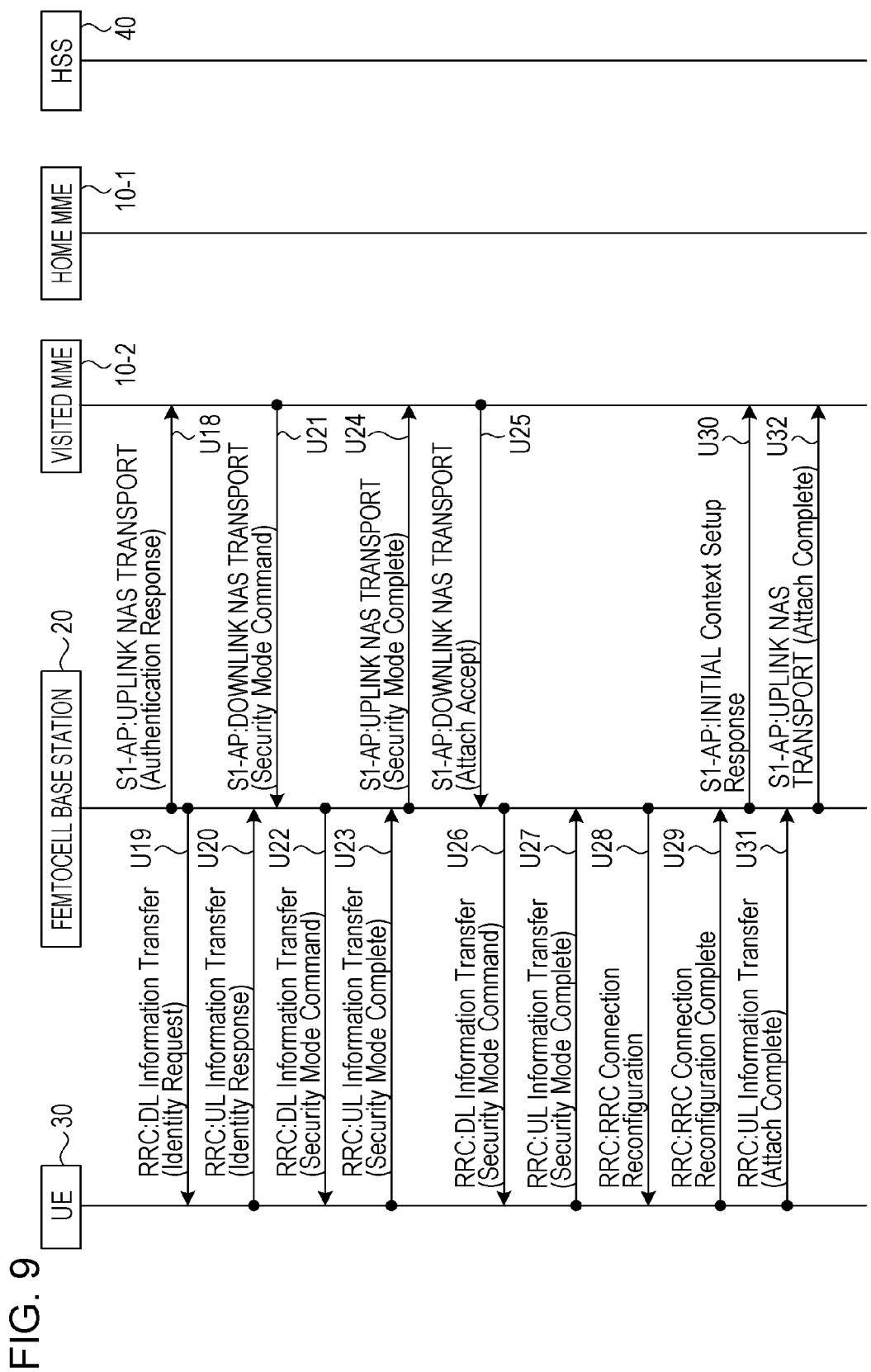
FIG. 9 is a diagram illustrating an example of an operational sequence for an alternative call reception registration process in the case where a UE is registered when a position of the UE is registered, according to an embodiment.

Since FIG. 8 includes the same processes as in FIGS. 5 and 6, common steps are given reference signs whose last numbers are the same, and detailed descriptions thereof will be omitted. Specifically, steps U1 to U4, U7, and U8 to U17 in FIG. 8 correspond to steps S1 to S4, S7, and S2 to S11 in FIG. 5, respectively. FIG. 9 is a sequence diagram for explaining the latter half of the alternative call reception registration process in the case where the UE 30 is registered when the location of the UE 30 is registered. Step U18 in FIG. 9 corresponds to step S12 in FIG. 5. Steps U19 and U20 in FIG. 9 correspond to steps S13 and S14, which are the alternative call reception registration process in FIG. 5, respectively. The processes in steps U21 to U23 of FIG. 9 correspond to the processes in steps S16 to S18 of FIG. 5, respectively. The processes in steps U24 to U27 and U28 to U32 of FIG. 9 correspond to the processes in steps S19 to S22 and S25 to S29 of FIG. 6, respectively.

Figure 10:
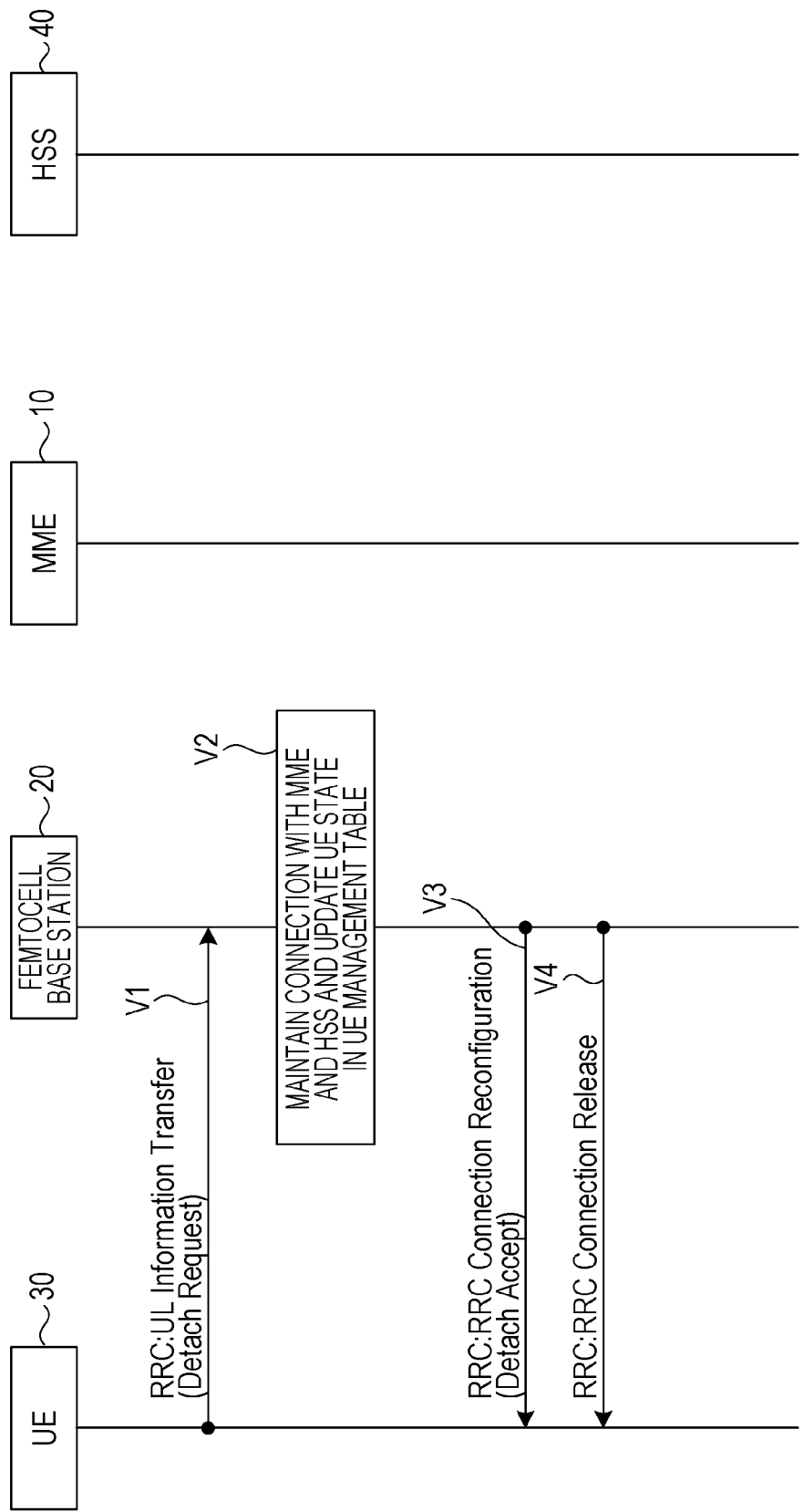
FIG. 10 is a diagram illustrating an example of an operational sequence for a detach-request termination process performed by a femtocell base station, according to an embodiment.

Next, the alternative call reception phase will be described. First, among operations in the alternative call reception phase, a process when the femtocell base station 20 received a detach request from the UE 30 will be described. FIG. 10 is a sequence diagram for explaining a detach-request termination process performed by the femtocell base station 20.

In V1, the UE 30 requests the femtocell base station 20 to release a line established by an attaching process (cancellation process), by transmitting a Detach Request by using UL Information Transfer. Upon confirming the Detach request by using the NAS-signaling processing unit 28, the femtocell base station 20 terminates the Detach request without transmitting the Detach request to a higher-level device (for example, the MME 10) and updates the UE management table 261 (V2). Specifically, upon confirming that the UE 30, which is a requester of the detachment, has been registered as an alternative call reception target, the UE managing unit 26 updates data indicating the state of the UE 30, among the data stored in the UE management table 261, from "Registered" to "Detach".

In V3, the NAS-signaling processing unit 28 of the femtocell base station 20 sends a Detach Accept indicating that the Detach Request is normally received, to the UE 30 by using RRC Connection Reconfiguration. Then, the call control unit 23 releases the wireless line established between the femtocell base station 20 and the UE 30, by transmitting RRC Connection Release (V4).

Figure 11:
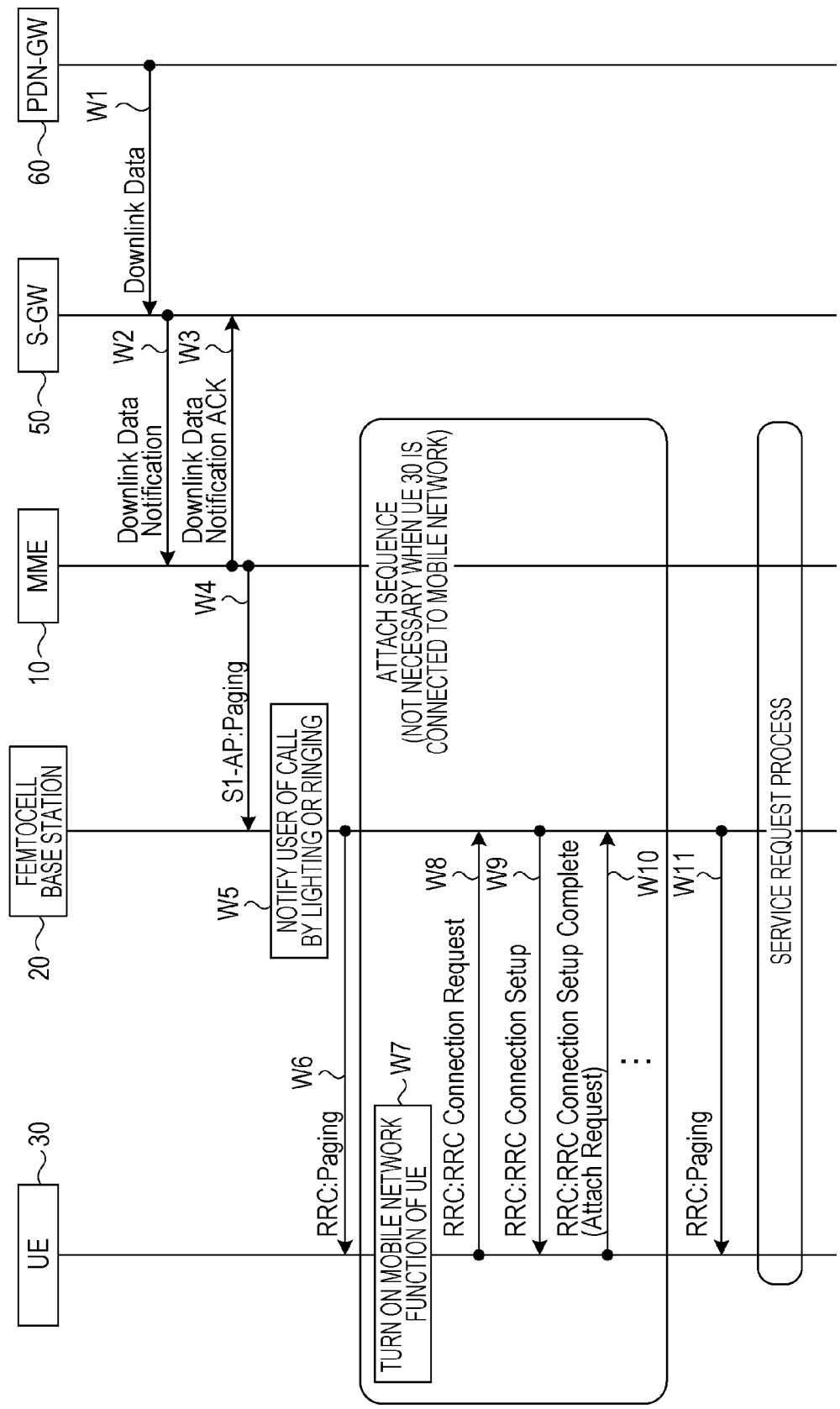
FIG. 11 is a diagram illustrating an example of an operational sequence for an alternative call receiving process when a UE connects to a mobile telephone network during call reception, according to an embodiment.

Next, an alternative call receiving process that the alternative call receiving system 1 executes when a call addressed to the UE 30 is made will be described. FIG. 11 is a sequence diagram for explaining an alternative call receiving process when the UE 30 connects to a mobile phone network during call reception.

First, upon receiving Downlink Data from a packet-data network-gateway (PDN-GW) 60 to the UE 30 (W1), an S-GW 50 notifies the MME 10 of the reception of Downlink Data by transmitting Downlink Data Notification (W2). The NW control unit 15 of the MME 10 sends, to the S-GW 50 (W3), an acknowledgement (ACK) indicating that Notification is normally received and thereafter transmits a paging signal for providing a notification of the call reception to all base stations (including the femtocell base station 20) under control of the TA in which the UE 30 is located or to the femtocell base station 20 by using the above S1-AP (W4).

The femtocell base station 20 transmits the paging signal received from the MME 10 (W6), and when the received call is addressed to registered UE (for example, the UE 30), the notification control unit 27 of the femtocell base station 20 notifies the user of the UE 30 that a call addressed to the UE 30 is made, by lighting an LED or ringing a speaker (W5). This allows the user of the UE 30 to know the call addressed to the UE 30.

In the case where the UE 30 is not connected to a mobile phone network, such as when the power of the UE 30 is off, the attach sequence of the UE 30 is executed by the user turning on the power of the UE 30. Since the attach sequence executed at that time is the same as the processes of S1 to S28 (except S18 and S19) described with reference to FIGS. 5 and 6, a detailed description thereof will be omitted.

After the UE 30 is connected to a mobile phone network or in the case where it has already been connected thereto, upon receiving the paging signal from the femtocell base station 20 (W11), the UE 30 transmits RRC Connection Setup Complete to the femtocell base station 20 to execute a service request process. Since the service request process executed at that time is the same as the processes in T1 to T15 and T24 to T28 described with reference to FIG. 7, a detailed description thereof will be omitted.

Figure 12:
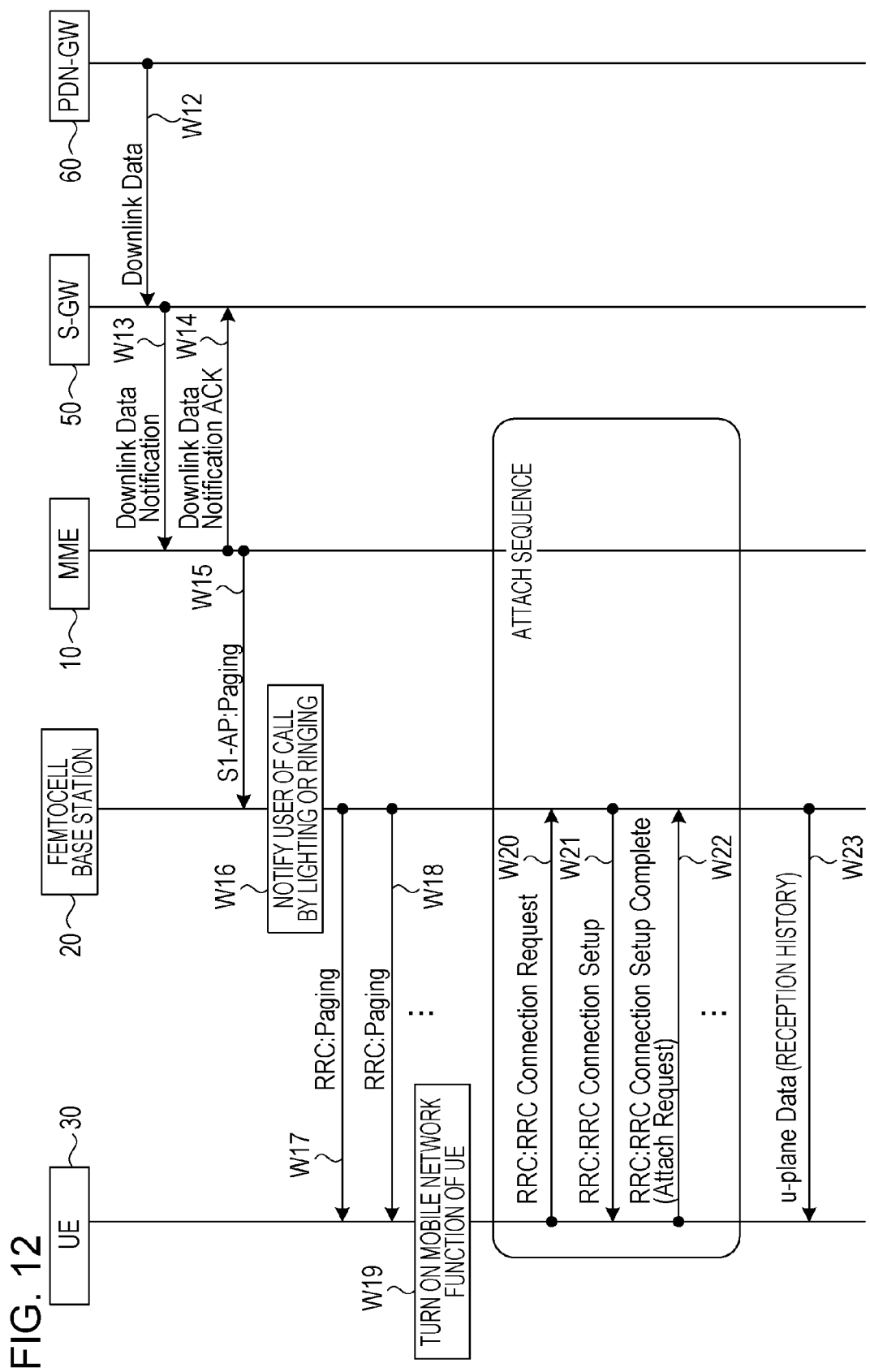
FIG. 12 is a diagram illustrating an example of an operational sequence for an alternative call receiving process in the case where a UE connects to a mobile telephone network after call reception is terminated, according to an embodiment.

FIG. 12 is a sequence diagram for explaining an alternative call receiving process in the case where UE that has made a call to the UE 30 stops the calling processing, and thereafter the UE 30 connects to a mobile phone network. Since FIG. 12 includes the same processes as those in FIG. 11, parts of common steps are given reference signs whose last numbers are the same, and detailed descriptions thereof will be omitted. Specifically, the processes in steps W12 to W17 and W20 to W22 of FIG. 12 correspond to the processes in steps W1 to W6 and W8 to W10 of FIG. 11, respectively. The difference between FIG. 11 and FIG. 12 is that, in FIG. 11, the attach sequence is executed during call reception, while in FIG. 12 the attach sequence is executed after completion of call reception.

In other words, in FIG. 12, when the UE 30 connects to the mobile phone network, transmission of the paging signal has already been ceased. Therefore, the user of the UE 30 is unable to perform reception answering process (service request). However, the femtocell base station 20 records information on the calling party (for example, the telephone number of the calling party) from the received paging signal and transmits to the UE 30 u-plane data on which an incoming call list (for example, the time of reception and the telephone number of the calling party) is recorded (W23). The user of the UE 30 can determine when and by whom the transmission is made by referring to the incoming call list.

Figure 13:
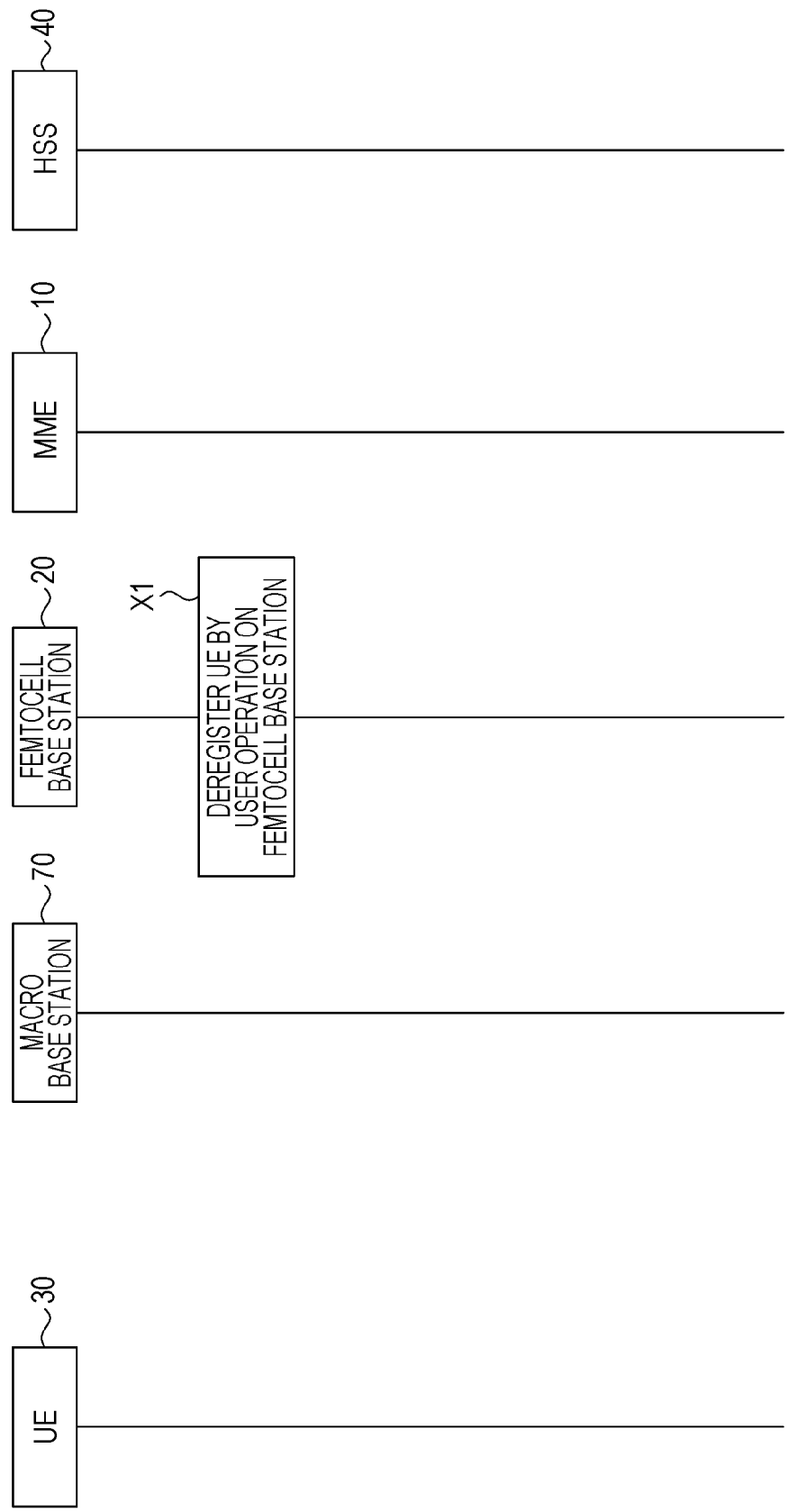
FIG. 13 is a diagram illustrating an example of an operational sequence for an alternative-reception-registration cancellation process in the case where a user deregisters a registered UE, according to an embodiment.

An operation in the registration cancellation phase will be described. FIG. 13 is a sequence diagram for explaining an alternative-reception-registration cancellation process in the case where the user deregisters the registered UE 30. In X1, the user of the UE 30 or the femtocell base station 20 cancels the registration of the UE 30 registered for alternative call reception by a direct button operation on the femtocell base station 20. In the case where plural pieces of UE are registered, the user selects a UE to be deregistered from among the registered UE displayed on the display 20h and thereafter gives an instruction to execute the cancellation process.

Figure 14:
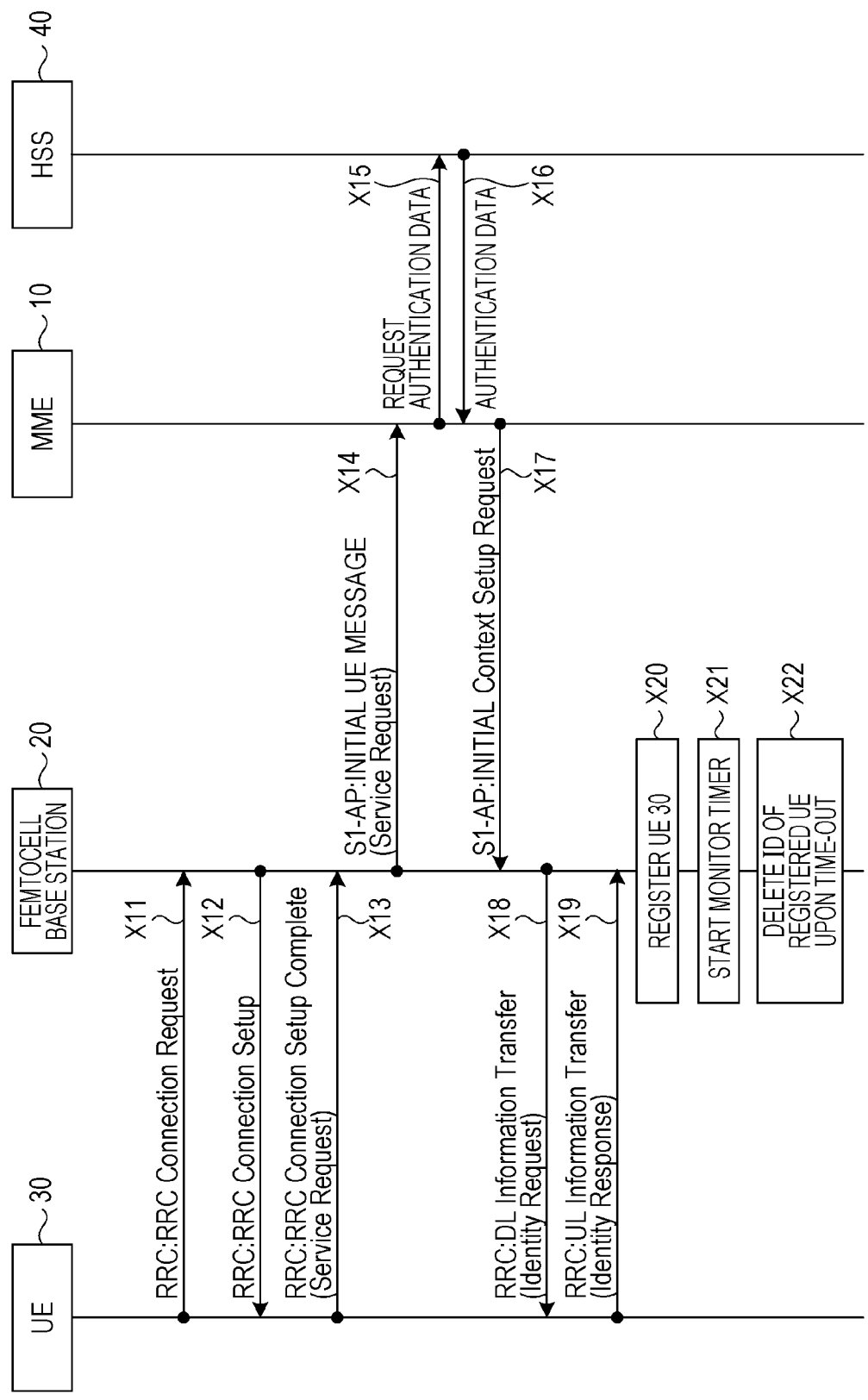
FIG. 14 is a diagram illustrating an example of an operational sequence for an alternative-reception-registration cancellation process in the case where a femtocell base station autonomously deregisters a registered UE after a lapse of a predetermined time from the registration thereof, according to an embodiment.

The deregistration of the registered UE may be autonomously performed by the femtocell base station 20. FIG. 14 is a sequence diagram for explaining an alternative-reception-registration cancellation process in the case where the femtocell base station 20 autonomously deregisters the registered UE 30 after the lapse of a predetermined time from the registration thereof. Since FIG. 14 includes the same processes as those in FIG. 7, common steps are given reference signs whose last numbers are the same, and detailed descriptions thereof will be omitted. Specifically, the processes in steps X11 to X17, X18, and X19 of FIG. 14 correspond to steps T1 to T7, T13, and T14 of FIG. 7, respectively.

Upon completion of the alternative call reception registration of the UE 30 (X20), the UE managing unit 26 of the femtocell base station 20 starts a monitor timer (X21). The monitor timer starts measurement of an elapsed time from the time when the UE 30 is registered. When the UE 30 accesses a mobile phone network (for example, requests connection), the monitor timer is reset, and measurement is restarted from an elapsed time of zero. In X22, a predetermined time (for example, one hour to several tens hours) has passed from the above base time without an access of the UE 30 to the mobile phone network, the UE managing unit 26 of the femtocell base station 20 deletes UE IDs in "Registered" state from the UE management table 261. Thus, the alternative call reception function using the femtocell base station 20 is autonomously cancelled.

Figure 15:
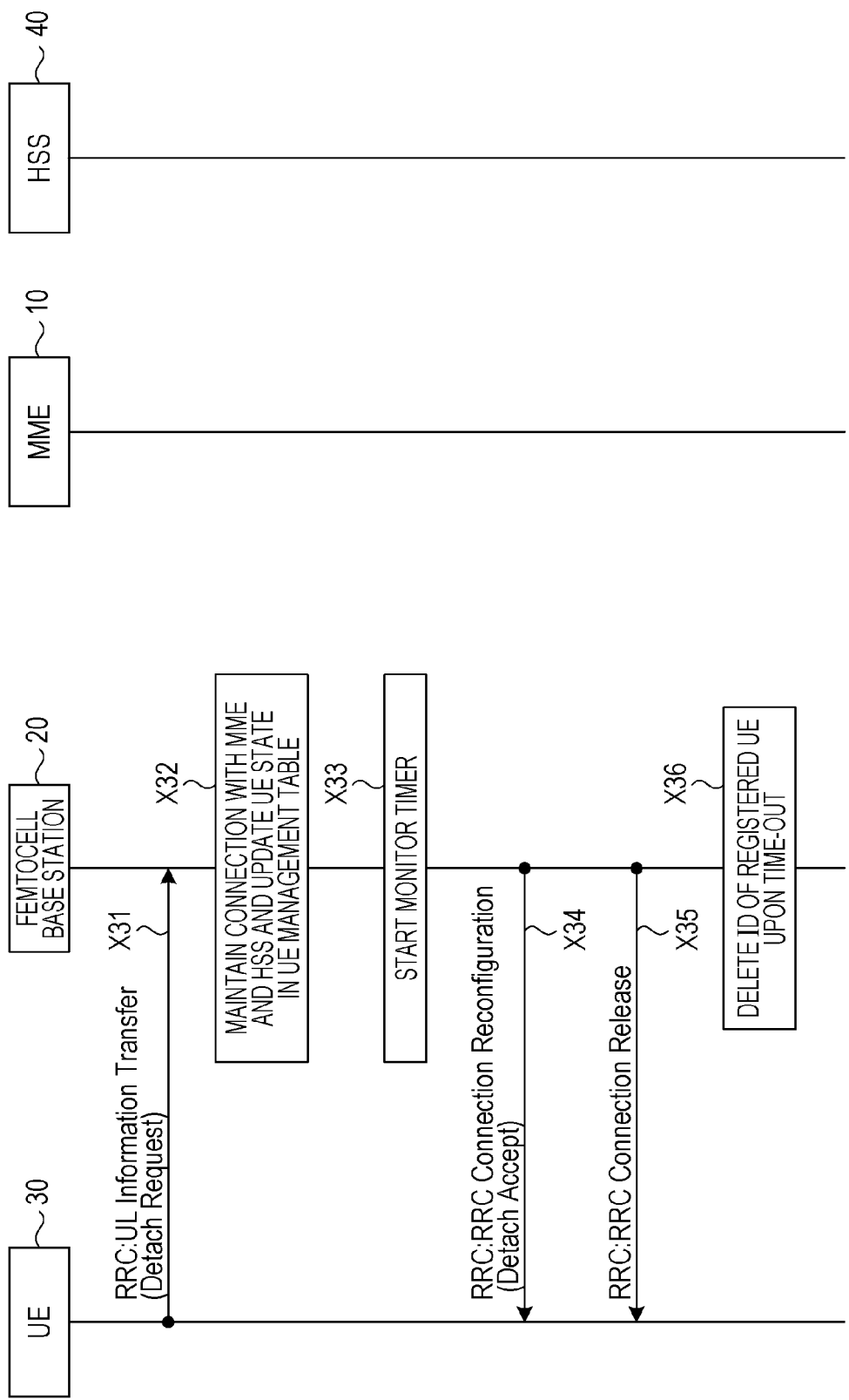
FIG. 15 is a diagram illustrating an example of an operational sequence for an alternative-reception-registration cancellation process in the case where a femtocell base station autonomously deregisters a registered UE after a lapse of a predetermined time from the start of a detaching process, according to an embodiment.

In the above embodiment, the time when the monitor timer is started is the time when the UE 30 is registered; alternatively, it may be the time when the UE 30 detaching process is started. FIG. 15 is a sequence diagram for explaining an alternative-reception-registration cancellation process in the case where the femtocell base station 20 autonomously deregisters the registered UE 30 after the lapse of a predetermined time from the start of the detaching process. Since FIG. 15 includes the same processes as those in FIG. 10, common steps are given reference signs whose last numbers are the same, and detailed descriptions thereof will be omitted. Specifically, steps X31, X32, X34, and X35 of FIG. 15 correspond to the processes in steps V1, V2, V3, and V4 of FIG. 10, respectively.

In X33, the UE managing unit 26 of the femtocell base station 20 receives Detach Request from the UE 30, updates the US state in the UE management table 261, and thereafter starts the monitor timer. The monitor timer starts measurement of an elapsed time from a starting time, that is, the time when the radio processing unit 25 received "UL Information Transfer" for requesting detaching. When the mobile network function of the UE 30 is turned on, in other words, when the attaching process is restarted, the monitor timer is reset and restarts the measurement from an elapsed time of zero. In X36, after a predetermined time (for example, one hour to several tens of hours) has passed from the above base time without the mobile network function being turned on by the UE 30, the UE managing unit 26 of the femtocell base station 20 deletes a UE ID in "Registered" state from the UE management table 261. Thus, the alternative call reception function using the femtocell base station 20 is autonomously cancelled.

In the case where the power of the UE 30 is again turned on before the monitor timer of the UE managing unit 26 of the femtocell base station 20 indicates time-out, the above attach sequence (see FIG. 11) is executed after the timer stops.

Figure 16:
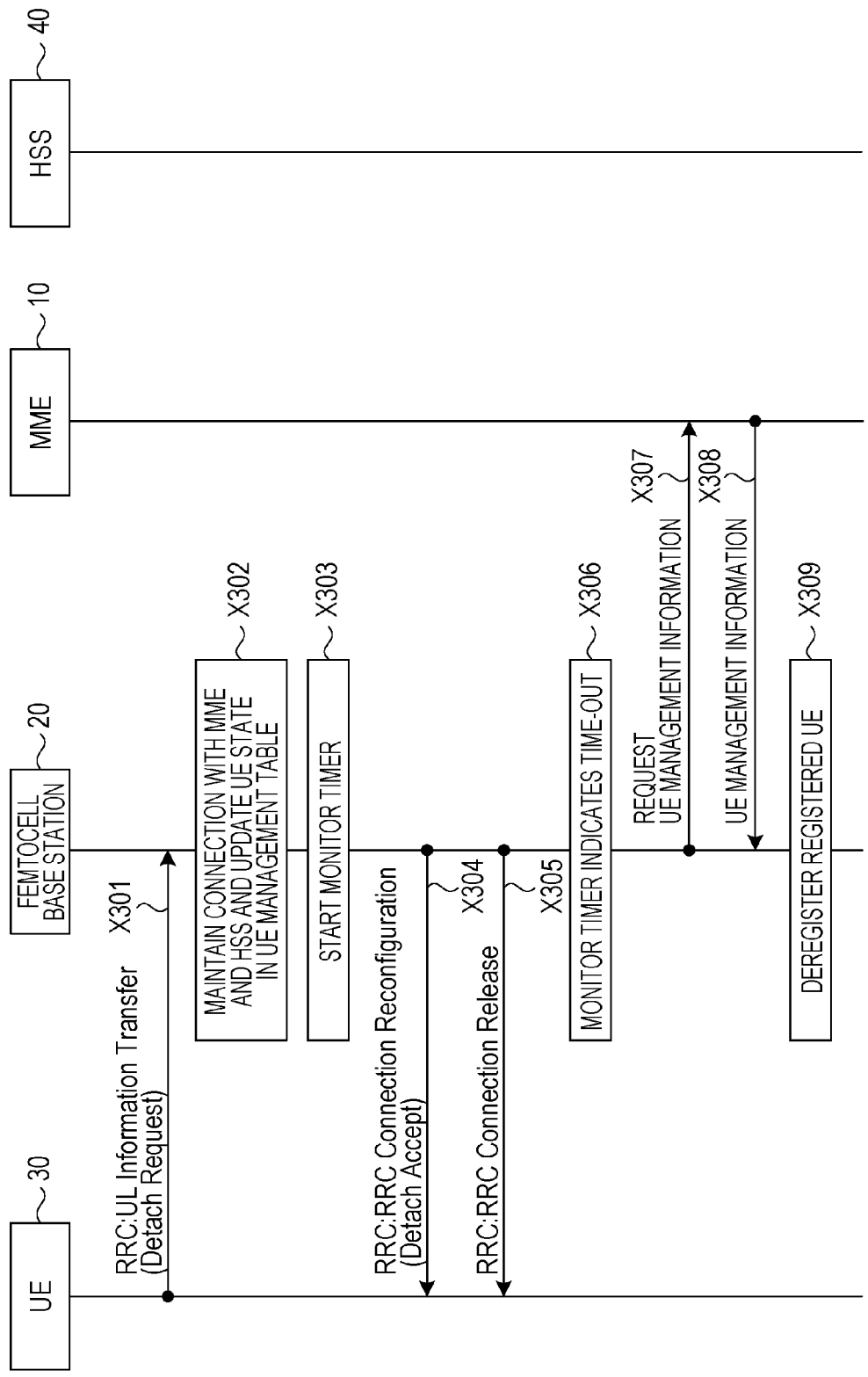
FIG. 16 is a diagram illustrating an example of an operational sequence for an alternative-reception-registration cancellation process in the case where a femtocell base station deregisters a registered UE after a lapse of a predetermined time from the start of a detaching process and after an inquiry to a MME, according to an embodiment.

Alternatively, the femtocell base station 20 may inquire of the MME 10, after the time-out, whether the UE 30 is registered in another base station and may deregister the UE 30 after confirming the registration. FIG. 16 is a sequence diagram for explaining an alternative-reception-registration cancellation process in the case where the femtocell base station 20 deregisters the registered UE 30 after the lapse of a predetermined time from the start of the detaching process and after the inquiry to the MME 10. Since FIG. 16 includes the same processes as those in FIG. 15, common steps are given reference signs whose last numbers are the same, and detailed descriptions thereof will be omitted. Specifically, the processes in steps X301 to X305 of FIG. 16 correspond to the processes in steps X31 to X35 of FIG. 15, respectively.

When the monitor timer of the UE managing unit 26 of the femtocell base station 20 indicates time-out, with the mobile network function of the UE 30 is in off-state (X306), the NW control unit 21 of the femtocell base station 20 requests the MME 10 to transmit UE management information (X307). Upon receiving the request, the NW control unit 15 of the MME 10 transmits the UE management information to the femtocell base station 20 (X308). The UE management information includes information indicating with which of the base stations in the area of the MME 10 the UE 30 is registered. This allows the UE managing unit 26 of the femtocell base station 20, which has received the UE management information, to determine whether the UE 30 is registered in a base station (for example, the macro base station 70) other than the femtocell base station 20 by referring to the UE management information.

In X309, when the UE 30 is registered with another base station, the UE managing unit 26 of the femtocell base station 20 deregisters the UE 30 from the UE management table 261, but when the UE 30 is not registered with another base station (when it is registered only with the femtocell base station 20), the UE managing unit 26 resets the monitor timer and restarts it. After restarting, the femtocell base station 20 executes the processes following X304 again. This avoids the occurrence of a situation in which the UE 30 is not registered in any base stations in the area of the MME 10, thus allowing reliable alternative call reception to be achieved.

Figure 17:
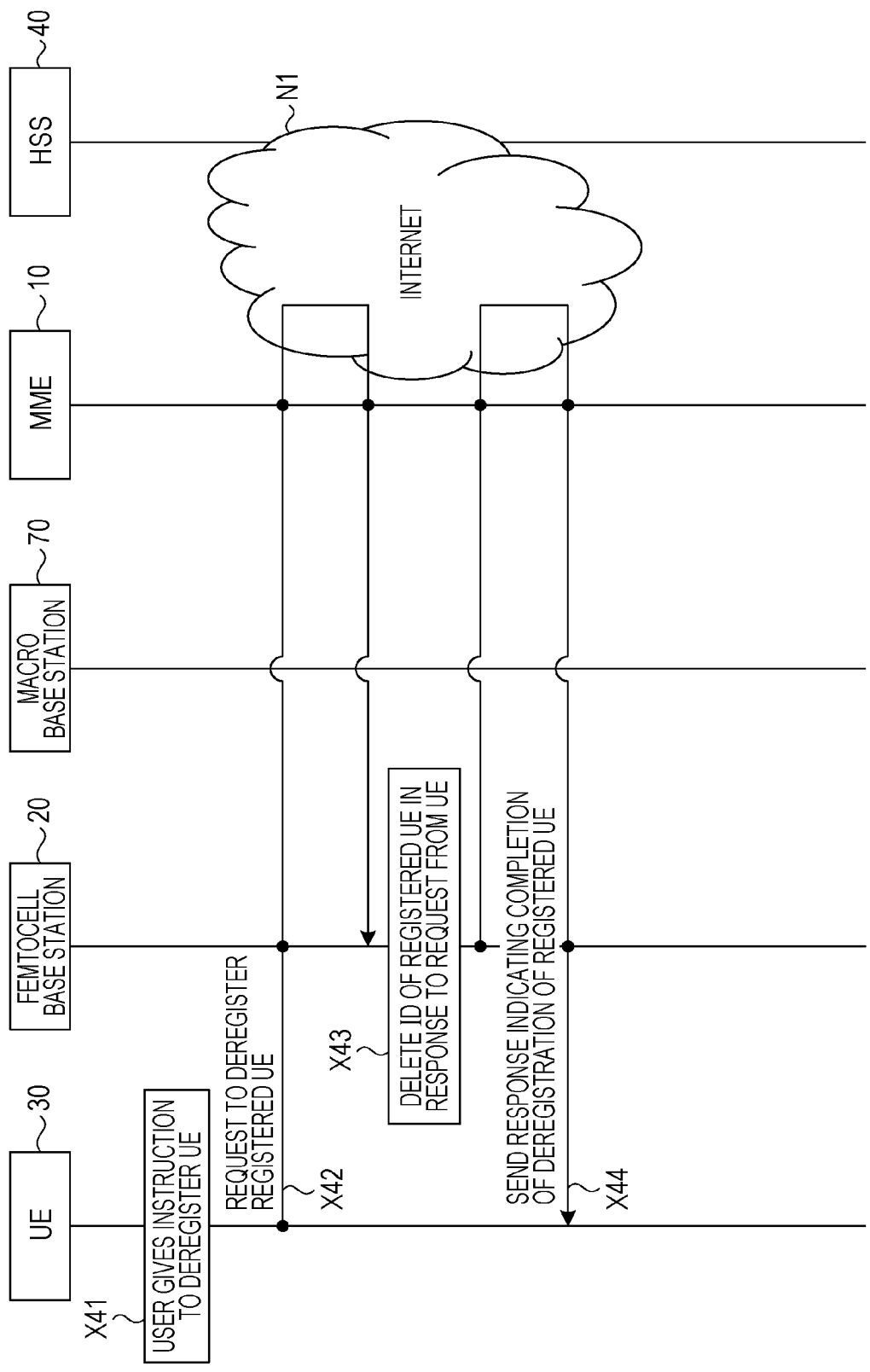
FIG. 17 is a diagram illustrating an example of an operational sequence for an alternative-reception-registration cancellation process in the case where a UE deregisters the registered UE, according to an embodiment.

The deregistration of the registered UE may be performed not only by a direct operation on the femtocell base station 20, but also indirectly by the UE 30. FIG. 17 is a sequence diagram for explaining an alternative-reception-registration cancellation process in the case where the UE 30 deregisters the registered UE 30. When the user of the UE 30 gives an instruction to deregister the UE 30 from the femtocell base station 20 (X41), the UE 30 requests the femtocell base station 20 to deregister the registered UE 30 (X42). Upon receiving the request, the UE managing unit 26 of the femtocell base station 20 deletes the ID of the UE 30 in "Registered" state from the UE management table 261 (X43). In X44, the radio processing unit 25 of the femtocell base station 20 sends a response indicating completion of deregistration of the registered UE 30 to the UE 30. Thus, the function of the femtocell base station 20 receiving an incoming call as an alternative to the UE 30 is cancelled.

Figure 18:
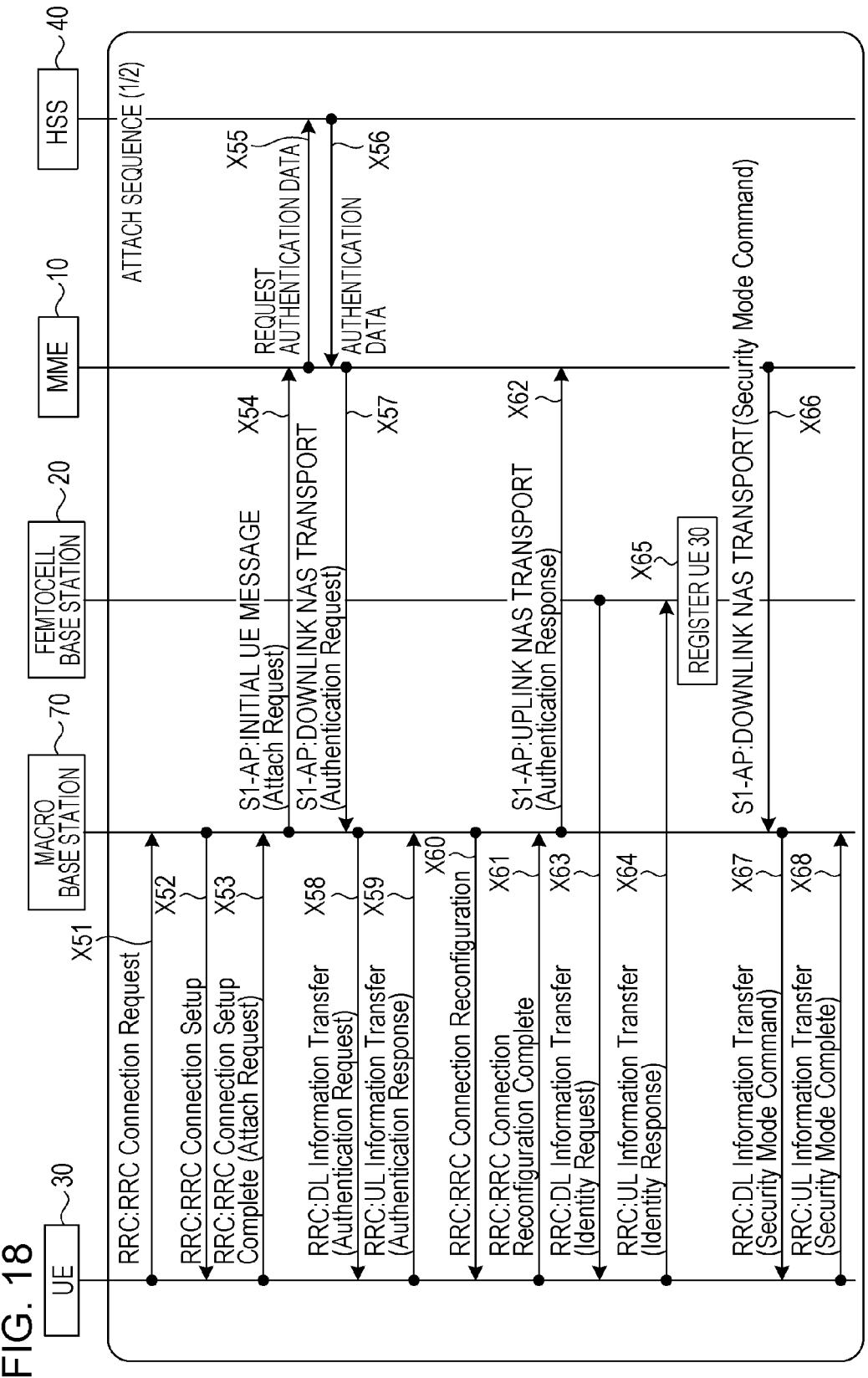
FIG. 18 is a diagram illustrating an example of an operational sequence for an alternative-reception-registration cancellation process in the case where a higher-level device of a femtocell base station deregisters a registered UE, according to an embodiment.

Here, assume that the UE 30 moves from the cell of the femtocell base station 20 with which alternative call reception is registered to the cell of a different macro base station 70, with the power off, and the power is again turned on in the area of the cell of the macro base station 70. In such a case, the MME 10, which is the higher-level device of both the base stations 20 and 70, deregisters the UE 30 from the home femtocell base station 20. FIG. 18 is a sequence diagram for explaining the first half of an alternative-reception-registration cancellation process in the case where the higher-level device of the femtocell base station 20 deregisters the registered UE 30. In FIG. 18, the configuration of the macro base station 70 (visited base station) to which the UE 30 newly connects after movement is the same as the configuration of the femtocell base station 20 (home base station) described above. Accordingly, in the following description, common components in the base stations 20 and 70 are given reference signs whose last numbers are the same, and detailed descriptions thereof will be omitted. Since FIG. 18 includes the same processes as those in FIG. 5, common steps are given reference signs whose last numbers are the same, and detailed descriptions thereof will be omitted. Specifically, the processes in steps X51 to X68 of FIG. 18 correspond to the processes in steps S1 to S18 of FIG. 5, respectively.

Figure 19:
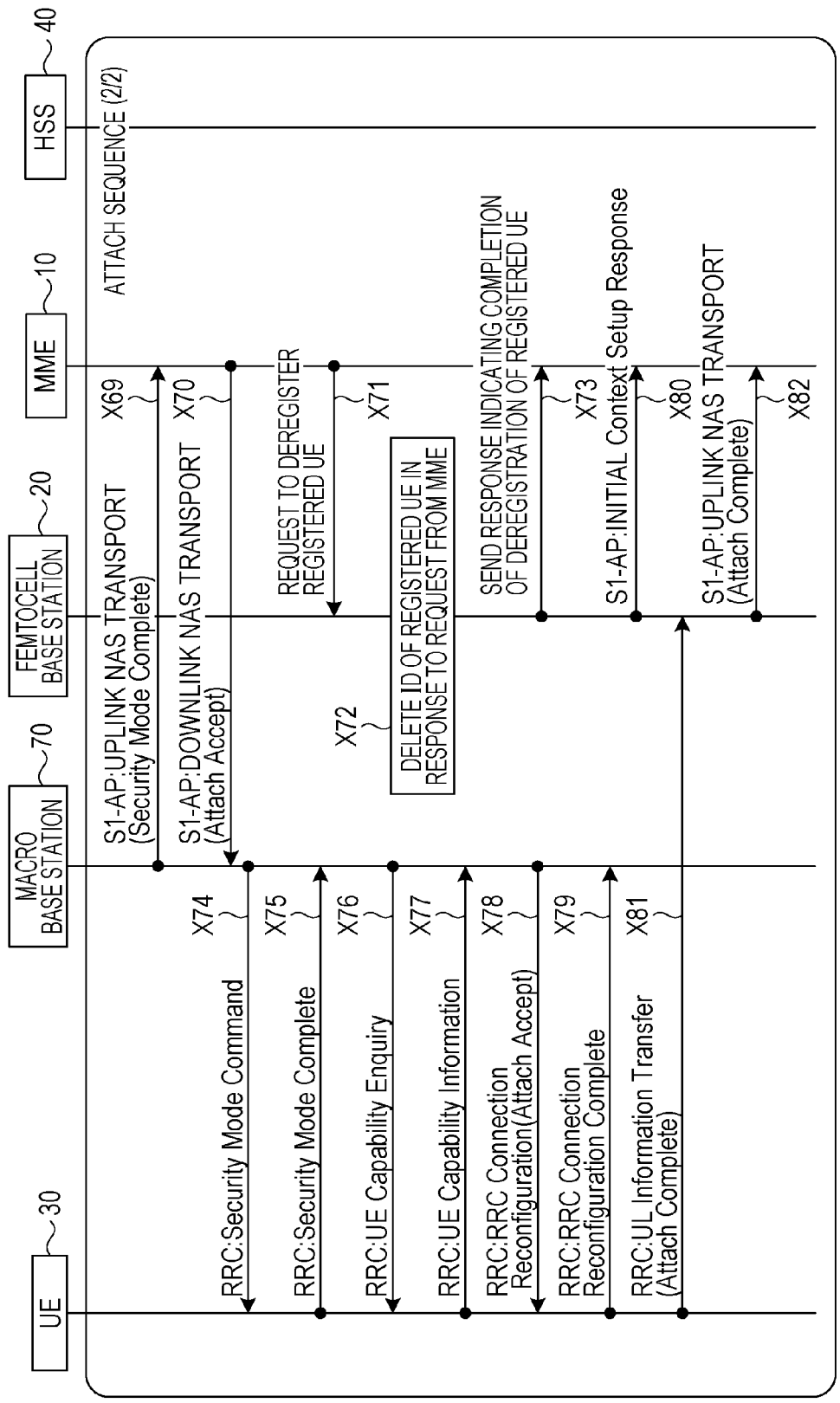
FIG. 19 is a diagram illustrating an example of an operational sequence for an alternative-reception-registration cancellation process in the case where the higher-level device of a femtocell base station deregisters the registered UE, according to an embodiment.

FIG. 19 is a sequence diagram for explaining the latter half of the alternative-reception-registration cancellation process in the case where the higher-level device of the femtocell base station 20 deregisters the registered UE 30. Since FIG. 19 includes the same processes as those in FIG. 6, common steps are given reference signs whose last numbers are the same, and detailed descriptions thereof will be omitted. Specifically, steps X69, X70, and X74 to X82 of FIG. 19 correspond to the processes in steps S19, S20, and S21 to S29 of FIG. 6, respectively.

For example, after completion of authentication of the UE 30, the MME 10 transmits Attach Accept, which indicates acceptance of attachment by the UE 30, to the macro base station 70 and thereafter requests the femtocell base station 20 to deregister the registered UE 30 (X71). Upon receiving the request, the UE managing unit 26 of the femtocell base station 20 deletes the ID of the UE 30 in "Registered" state from the UE management table 261 (X72). In X73, the femtocell base station 20 sends a response indicating completion of deregistration of the registered UE 30 to the MME 10. Thus, the function of the femtocell base station 20 receiving an incoming call as an alternative to the UE 30 is cancelled. In this embodiment, a request to deregister the registered UE 30 is made when Attach Accept is received; alternatively, the request may be issued after completion of the UE 30 attaching process (after X82). In this embodiment, the base station to which a detach request is issued is only the femtocell base station 2; alternatively, the MME 10 may request all base stations under control thereof, except the base station (macro base station 70) that has transmitted Attach Accept, to deregister the registered UE 30.

Figure 20:
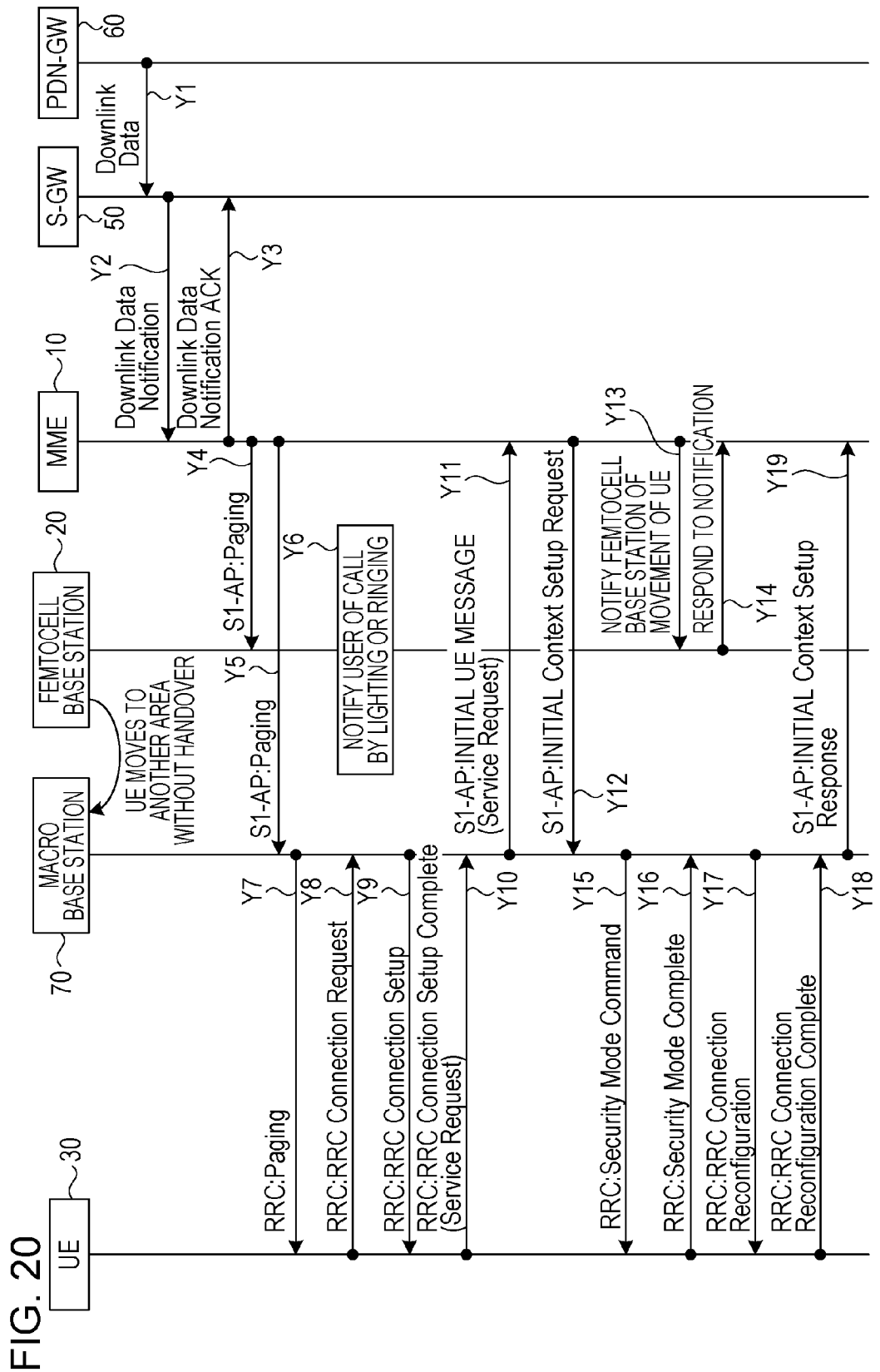
FIG. 20 is a diagram illustrating an example of an operational sequence for an alternative call receiving process in the case where a UE moves from a femtocell base station to a macro base station without performing handover, according to an embodiment.

This embodiment may also be applied to a case where the UE 30 moves to the cell of another base station without performing handover. FIG. 20 is a sequence diagram for explaining an alternative call receiving process in the case where the UE 30 moves from the femtocell base station 20 to the macro base station 70 without performing handover, such as when the UE 30 moves from the area of the femtocell base station 20 to another base station (for example, the macro base station 70), with the mobile network function being cut, and turns on the mobile network function in the area of the other base station. Since FIG. 20 includes the same processes as those in FIGS. 11, 14, and 6, common steps are given reference signs whose last numbers are the same, and detailed descriptions thereof will be omitted. Specifically, the processes in steps Y1 to Y7 of FIG. 20 correspond to the processes in steps W1 to W6 of FIG. 11, respectively. The processes in steps Y8 to Y12 of FIG. 20 correspond to the processes in steps X11 to X17 (except X15 and X16) of FIG. 14. The processes in steps Y15 to Y18 of FIG. 20 correspond to the processed in steps S21, S22, S25, and S26 of FIG. 6, respectively.

In Y13, the MME 10 notifies the femtocell base station 20 of the movement of the registered UE 30 (Y13). Upon receiving the notification, when the UE 30 is registered in the UE management table 261, the UE managing unit 26 of the femtocell base station 20 cancels the registration. In Y14, the femtocell base station 20 sends a response to the notification to the MME 10. Thus, the femtocell base station 20 may avoid flashing or ringing in the home area after the user of the UE 30 has moved. This allows efficient alternative call reception in which the power consumption and processing loads of the femtocell base station 20 are reduced.

In this embodiment, the base station to be notified of the movement of the UE 30 is only the femtocell base station 20; alternatively, the MME 10 may notify the movement of the registered UE 30 to all base stations under control thereof other than the base station (macro base station 70) to which INITIAL Context Setup Request is transmitted.

Figure 21:
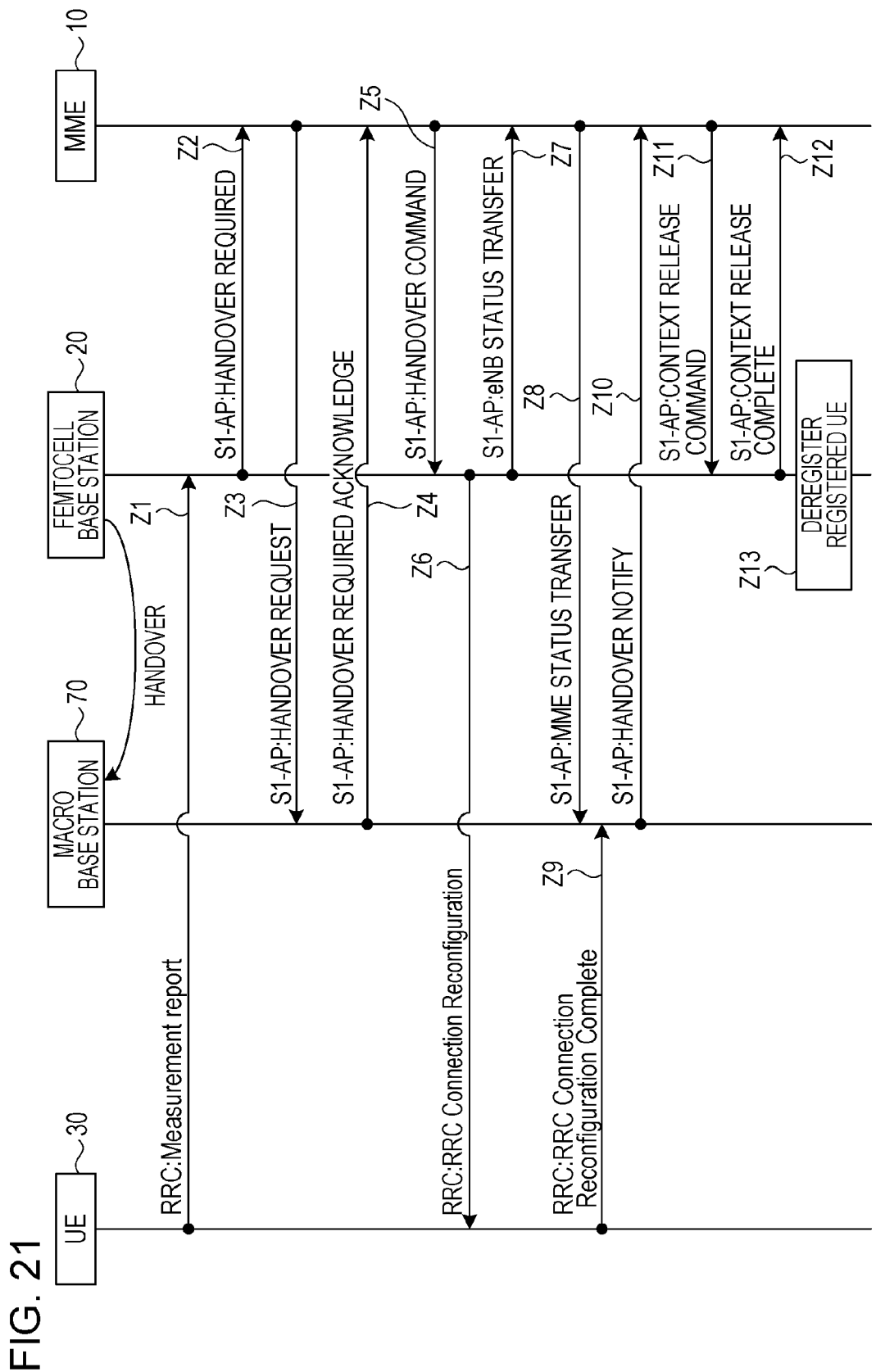
FIG. 21 is a diagram illustrating an example of an operational sequence for an alternative call receiving process in the case where a UE performs handover from a femtocell base station to the macro base station, according to an embodiment.

This embodiment may also be applied to a case where the UE 30 performs handover. FIG. 21 is a sequence diagram for explaining an alternative call receiving process in the case where the UE 30 performs handover from the femtocell base station 20 to the macro base station 70. In Z1, the femtocell base station 20 receives, from the UE 30, a Measurement report about the measurement result of the reception level of the UE 30.

When the femtocell base station 20 determines that the UE 30 has to be handed over, on the basis of the above reported measurement result, the femtocell base station 20 starts a handover process (Z2 to Z11).

Upon completion of the handover process (Z12), the femtocell base station 20 deregisters the handed-over UE 30. In Z13, as the UE 30 is handed over, the UE managing unit 26 of the femtocell base station 20 deregisters the UE 30 from the UE management table 261.

As described above, the alternative call receiving system 1 according to the embodiment includes the femtocell base station 20 and the MME 10 that is able to communicate with the femtocell base station 20. The femtocell base station 20 includes the UE managing unit 26, the NW control unit 21, and the notification control unit 27. The UE managing unit 26 registers the UE 30 subject to the reception control of the femtocell base station 20. When connection between the UE 30 registered by the UE managing unit 26 and the femtocell base station 20 is terminated (for example, when the power is turned off, the mobile network function is turned off, or the UE 30 is shifted to a power saving mode) after detecting that the UE 30 is located in the area of the femtocell base station 20, the NW control unit 21 causes the MME 10 to maintain information indicating that the UE 30 is located, without notifying the MME 10 of the termination of the connection. The NW control unit 21 maintains the connection between the femtocell base station 20 and the MME 10. When the notification control unit 27 detects a call addressed to the UE 30 after termination of the connection between the UE 30 and the MME 10, the notification control unit 27 notifies the MME 10 of the detection of the call. The MME 10 includes the NW control unit 15. When the connection between the UE 30 and the MME 10 is terminated, the NW control unit 15 maintains the location information of the UE 30 and maintains the connection between the MME 10 and the femtocell base station 20. When the NW control unit 15 detects a call addressed to the UE 30, the NW control unit 15 notifies the femtocell base station 20 of the detection of the call. This allows the user of the UE 30 to detect the incoming call, even if the UE 30 is unable to communicate with the femtocell base station 20, thus reducing missing an incoming call.

In the femtocell base station 20, the UE managing unit 26 may register the UE 30 when the UE 30 makes a call. There is a high probability that the UE 30 that has made a call may thereafter receive a call from another UE or the like. Therefore, causing the femtocell base station 20 to register the UE 30 for alternative call reception at the time of making a call allows the user of the UE 30 to detect a call addressed thereto reliably and early.

In the femtocell base station 20, the UE managing unit 26 may deregister the UE 30 after the lapse of a predetermined time from the registration of the UE 30. In other words, the femtocell base station 20 automatically deregisters the UE 30 after the lapse of a predetermined time from the registration of the UE 30. This prevents the femtocell base station 20 from performing alternative call reception when the alternative call receiving function becomes unnecessary.

In the above embodiment, an example of a cause for terminating the connection between the UE 30 and the femtocell base station 20 after the UE 30 is located in the communication area of the femtocell base station 20 is powering-off of the UE 30. The cause is not limited thereto; the cause may be a case where the user turns off the mobile network function, with the power of the UE 30 kept on, to use a wireless LAN or a game. Alternatively, the cause may be a case where the UE 30 shifts to a power saving mode in which no report information from the femtocell base station 20 is received in order to reduce the power consumption. Alternatively, the cause may be a case where the UE 30 has moved out of the communication area of the femtocell base station 20 as the user moves. The time when the power and the mobile network functions are turned off includes the time when the remaining amount of the battery charge is reduced to zero due to, for example, a long-time use of the UE 30 irrespective of user's intention.

The above embodiment assumes that the UE 30 is registered as an object UE of alternative call reception; when plural pieces of UE are registered, the femtocell base station 20 may adopt a configuration in which a UE to which an incoming call is given is identified. For example, the notification control unit 27 of the femtocell base station 20 may change means for notification, depending on the UE that is given an incoming call. Specifically, when a call addressed to a UE 30-1 is given, the notification control unit 27 acts as an alternative, using the LED 20f; and when a call addressed to a UE 30-2 is given, the speaker 20g may be used. Even with the LED 20f, the notification control unit 27 may change the color or time of lighting or the interval of flashing, depending on the UE to which a call is given. Likewise, even with the speaker 20g, the notification control unit 27 may change the sound or time of ringing, depending on the UE to which a call is given. Thus, when alternative call reception is made by the femtocell base station 20, the user of each UE may determine whether it is a call addressed to the UE.

Furthermore, even if the mobile network function of the UE 30 is off, when the power of the UE 30 is on, and when another communication means, such as a wireless LAN, is on, the femtocell base station 20 may notify the user of the UE 30 of a call addressed to the UE 30 via the another communication means. According to this embodiment, the femtocell base station 20 may notify the user of the UE 30 of a call addressed to the UE 30 more directly and reliably. This improves the reliability of the alternative call receiving system 1.

In the above embodiment, registration of alternative call reception is cancelled in response to a request from the user of the UE 30 or due to time-out. Alternatively, the user may set a period of time during which the alternative call receiving function is turned on or off. Specifically, in the case where the user of the UE 30 sets a period of time, in advance, in which the alternative call receiving function of the femtocell base station 20 for the registered UE 30 is turned off (canceled), the femtocell base station 20 does not notify the registered UE 30 of a call addressed to the UE 30 during the above period of time. In contrast, in the case where the user of the UE 30 sets a period of time, in advance, in which the alternative call receiving function of the femtocell base station 20 for the registered UE 30 is turned on, the femtocell base station 20 receives a call addressed to the UE 30 as an alternative only during the above period of time. Thus, the femtocell base station 20 does not notify the user of the UE 30 of a call by flashing or ringing during a period of time during which the user of the registered UE 30 is unable to receive a call, such as while sleeping (for example, 22:00 to 6:00) or eating (for example, 12:00 to 13:00). This improves the convenience of the alternative call receiving system 1. In contrast, in the case where the user of the registered UE 30 wants alternative call reception only during a specified period of time of a day, the user can temporarily use the alternative call reception function by setting the period of time to the femtocell base station 20 in advance. This improves the flexibility of the alternative call receiving system 1.

The above embodiments assume wireless communication terminals, such as a mobile phone, a smart phone, or a personal digital assistant (PDA) as the UE 30; the UE 30 is not limited thereto. The embodiments may be applied not only to mobile stations but also to various kinds of communication equipment having a function of communicating with a base station. An incoming call that the base station receives as an alternative may include not only a phone call or e-mail but also information, such as news and advertisements, and notification of software upgrades and emergency information. Furthermore, in the above embodiments, a handover between a small base station connected to a broadband network, such as a femtocell base station, and a macro base station is assumed as handover. However, it is not limited thereto; the embodiments may also be applied to a handover between small base stations and a handover between macro base stations.

Furthermore, the components of the MME 10 illustrated in FIG. 1 do not necessarily have to be physically configured as in FIG. 1. In other words, the actual distribution and integration of the components are not limited to those in FIG. 1; all or part thereof may also be distributed or integrated functionally or physically in any units depending on the various loads and use conditions thereof. For example, the call control unit 13 and the NW control unit 15 of the MME 10, or the OAM unit 22 and the BB processing unit 24 of the femtocell base station 20 may each be integrated as one component. In contrast, the UE managing unit 17 of the MME 10 may be distributed to a unit for identifying, registering, and deregistering a UE and a unit for notifying information on the movement of the UE. The NW control unit 21 and the radio processing unit 25 of the femtocell base station 20 may be distributed to a unit for receiving various signals and data and a unit for transmitting them. Furthermore, the memories 10c and 20c may be connected via a network or a cable as external devices of the MME 10 and the femtocell base station 20.

All examples and conditional language recited herein are intended for pedagogical purposes to aid the reader in understanding the invention and the concepts contributed by the inventor to furthering the art, and are to be construed as being without limitation to such specifically recited examples and conditions. Nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station in a mobile phone network, the base station comprising:
   a processor configured:
      to register a mobile station of a user as user equipment to be subjected to call reception control of the base station,
      to cause, when connection between the registered mobile station and a higher-level device of the base station in the mobile phone network is terminated after detecting that the mobile station is located in a communication area of the base station, the higher-level device to maintain information indicating that the mobile station is located in the communication area, without notifying the higher-level device of a termination of the connection, and
      to give, when a first call addressed to the mobile station is detected after the termination of the connection between the mobile station and the higher-level device in the mobile phone network, a notification about detection of the first call to the user of the mobile station, by using at least one of a light-emitting diode, a speaker, a display device, and a communication device other than the mobile phone network, which is provided for the base station in a Local Area Network (LAN); and
   a memory configured to store information on the registered mobile station.

2. The base station of claim 1, wherein the processor registers the mobile station when a second call is made from the mobile station.

3. The base station of claim 1, wherein
   the processor deregisters the mobile station at, at least one of timings:
      when a predetermined time has elapsed from registering the mobile station;
      when a request to deregister the mobile station is received from the mobile station of the user; and
      when a request to deregister the mobile station of the user is received from the higher-level device.

4. A call reception control system in a mobile phone network, the call reception control system comprising:
   a base station; and
   a higher-level device configured to communicate with the base station, wherein
   the base station is configured:
      to register a mobile station of a user as user equipment to be subjected to call reception control of the base station,
      to cause, when connection between the registered mobile station and the higher-level device of the base station in the mobile phone network is terminated after detecting that the mobile station is located in a communication area of the base station, the higher-level device to maintain information indicating that the mobile station is located in the communication area, without notifying the higher-level device of a termination of the connection, and
      to give, when a first call addressed to the mobile station is detected after the termination of the connection between the mobile station and the higher-level device in the mobile phone network, a notification about detection of the first call to the user of the mobile station, by using at least one of a light-emitting diode, a speaker, a display device, and a communication device other than the mobile phone network, which is provided for the base station in a Local Area Network (LAN); and
   the higher-level device is configured:
      to maintain, when the connection between the mobile station and the higher-level device is terminated, information indicating that the mobile station is located in the communication area, and
      to notify, when a second call addressed to the mobile station is detected, the base station of detection of the second call, via the mobile phone network.

5. A method for controlling call reception, the method being performed by a base station in a mobile phone network, the method comprising:
   registering a mobile station of a user as user equipment to be subjected to call reception control of the base station;
   causing, when connection between the registered mobile station and a higher-level device of the base station in the mobile phone network is terminated after detecting that the mobile station is located in a communication area of the base station, the higher-level device to maintain information indicating that the mobile station is located in the communication area, without notifying the higher-level device of termination of the connection; and
   giving, when a call addressed to the mobile station is detected after termination of the connection between the mobile station and the higher-level device in the mobile phone network, a notification about detection of the call to the user of the mobile station, by using at least one of a light-emitting diode, a speaker, a display device, and a communication device other than the mobile phone network, which is provided for the base station in a Local Area Network (LAN).

* * * * *